(12) United States Patent
Ofek et al.

(10) Patent No.: US 7,548,659 B2
(45) Date of Patent: Jun. 16, 2009

(54) VIDEO ENHANCEMENT

(75) Inventors: Eyal Ofek, Beijing (CN); Yasuyuki Matsushita, Beijing (CN)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 11/128,951

(22) Filed: May 13, 2005

(65) Prior Publication Data

US 2006/0257042 A1  Nov. 16, 2006

(51) Int. Cl.
G06K 9/40  (2006.01)
H04N 3/16  (2006.01)
(52) U.S. Cl. .................................. 382/254; 348/208.99
(58) Field of Classification Search .................. 382/254
See application file for complete search history.

(56) References Cited

U.S. PATENT DOCUMENTS

| | | | | |
|---|---|---|---|---|
| 5,784,115 | A | * | 7/1998 | Bozdagi ..................... 348/452 |
| 5,963,675 | A | * | 10/1999 | van der Wal et al. ........ 382/260 |
| 6,459,822 | B1 | * | 10/2002 | Hathaway et al. ........... 382/296 |
| 6,665,450 | B1 | * | 12/2003 | Cornog et al. .............. 382/276 |
| 7,119,837 | B2 | * | 10/2006 | Soupliotis et al. ...... 348/208.99 |
| 7,221,776 | B2 | * | 5/2007 | Xiong ........................ 382/103 |

OTHER PUBLICATIONS

Wexler, Y.; Shechtman, E.; Irani, M., "Space-time video completion," Computer Vision and Pattern Recognition, 2004. CVPR 2004. Proceedings of the 2004 IEEE Computer Society Conference on , vol. 1, no., pp. I-120-I-127 vol. 1, Jun. 27-Jul. 2, 2004.*

Bascle et al., "Motion Deblurring And Super-Resolution From An Image Sequence", Proceedings of Fourth European Conference on Computer Vision, vol. 2, 1996, pp. 573-582: 10 pages.

Bouguet, J.Y., "Pyramidal Implementation Of The Lucas Kanade Feature Tracker: Description Of The Algorithm", Open CV Document, Microprocessor Research Labs, 2000: pp. 1-9.

Litvin et al., "Probabilistic Video Stabilization Using Kalman Filtering And Mosaicking", Proceedings of IS&T/SPIE Symposium on Electronic Imaging, Image and Video Communications and Proc.. Jan. 2003: 12 pages.

* cited by examiner

Primary Examiner—Bhavesh M Mehta
Assistant Examiner—Hadi Akhavannik
(74) Attorney, Agent, or Firm—Lee & Hayes, PLLC

(57) ABSTRACT

Video enhancement enable visually-apparent improvements to image frames of a video sequence. In an example implementation, stabilized or other image frames include missing image areas that are filled using a video completion technique. The missing image areas are filled in using a video completion technique that involves motion inpainting. Local motion data of a motion map from known image areas is propagated into the missing image areas to produce an extended motion map. Pixels of the missing image areas are then filled in by warping pixels from neighboring image frames into the missing image areas responsive to the extended motion map. In another example implementation, video deblurring reduces the blurriness of a current image frame. Sharper image pixels from neighboring image frames are transferred so as to replace blurry pixels of the current image frame. In yet another example implementation, video completion with motion inpainting enables amelioration of visual artifacts.

17 Claims, 18 Drawing Sheets

CURRENT FRAME            MOTION INTERPOLATION

LEGEND:
$M$ -- Missing area
$p_t$ -- Pixel receiving motion value
$q_t$ -- Neighborhood pixels to $p_t$

VIDEO ENHANCEMENT

TECHNICAL FIELD

This disclosure relates in general to enhancing video and in particular, by way of example but not limitation, to improving the visual appearance of one or more image frames of a video sequence.

BACKGROUND

Creating home videos is a popular use of consumer video cameras. People take videos of sporting events, family gatherings, first-time activities of their children, and other special events. Unfortunately, home videos often suffer from moderate to severe shakes. These shakes tend to arise from the recording habits of consumers. Such habits include both walking with the camera and shooting long video shots with no tripod or other support. The resulting videos are generally too long, unedited, lacking in good composition, devoid of scripting, and shaky.

Consequently, video enhancement has been steadily gaining in importance. Video enhancement can improve videos in real-time or after the recording is completed. An important aspect of video enhancement is video stabilization, which is the process of generating a new compensated video sequence when undesirable image motion caused by camera jittering is removed. Unfortunately, existing approaches to video stabilization produce noticeably degraded video sequences.

SUMMARY

Video enhancement enables visually-apparent improvements to image frames of a video sequence. In a described example implementation, stabilized or other image frames include missing image areas that are filled using a video completion technique. The missing image areas are filled in using a video completion technique that involves motion inpainting. Local motion data of a motion map from known image areas is propagated into the missing image areas to produce an extended motion map that also encompasses the missing image areas. Pixels of the missing image areas can then be filled in by warping pixels from neighboring image frames into the missing image areas responsive to the extended motion map.

In another described example implementation, video deblurring reduces the blurriness of a current image frame. Sharper image pixels from neighboring image frames are transferred so as to replace blurry pixels of the current image frame. In yet another described example implementation, video completion with motion inpainting enables amelioration of visual artifacts.

Other method, system, approach, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

INTRODUCTION

Figure 1:
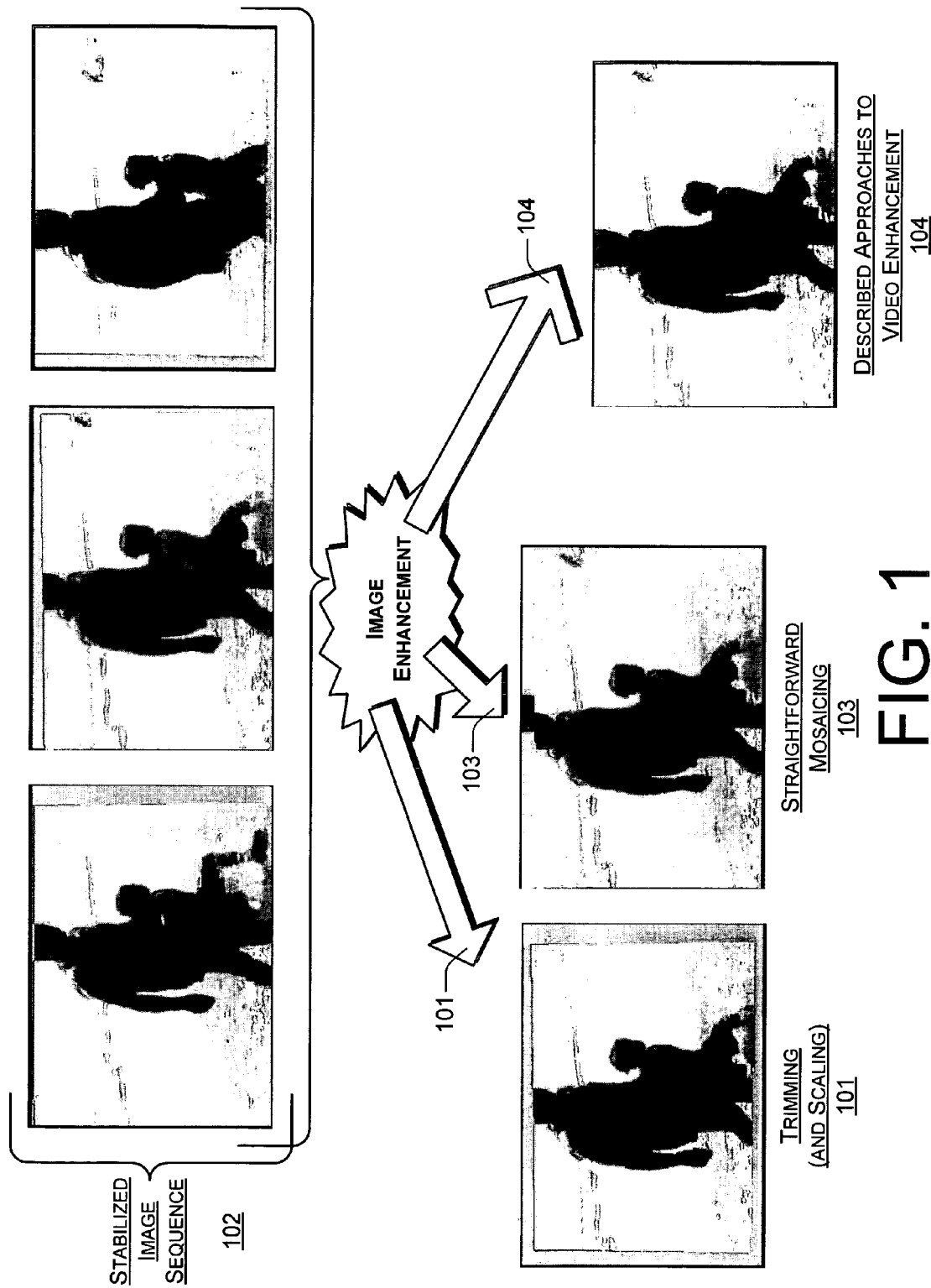
FIG. 1 illustrates example results of three different approaches to enhancing images of a video.

As explained above, an important aspect of video enhancement is video stabilization, which can generate a new compensated video sequence that reduces or eliminates undesirable image motion caused by camera jittering. Unfortunately, a major problem of current video stabilizers is that missing image areas appear in the stabilized video due to the compensation of the motion path.

The missing image areas have been conventionally addressed with one of two options: trimming the video to obtain only the portion that appears in all frames or constructing straightforward image mosaics by accumulating from neighboring frames to fill up the missing image areas. The former approach is problematic because it reduces the original video resolution when the trimmed images are scaled. Moreover, sometimes due to severe camera-shake, there is no common area among neighboring frames. The latter approach can work satisfactorily for static and planar scenes, but it produces visible artifacts for dynamic or non-planar scenes.

Accordingly, there is a need for schemes, mechanisms, techniques, etc. that can generate full-frame stabilized videos with good visual quality in a practical and/or robust manner. In example described implementations, the motion of image frames is estimated, the estimated motion of the image frames is smoothed, the image frames having the smoothed motion are completed, and the completed image frames are deblurred. Visual artifacts, if any, may also be identified, removed, and patched in the image frames. More specifically, video completion may be accomplished using motion inpainting, which involves propagating local motion data to naturally stitch image mosaics. Also, the image deblurring may be accomplished using sharp pixels from neighboring frames, which are selected using a relative blurriness measure.

In an example implementation, video completion that is based on motion inpainting is utilized. Instead of relying on color/intensity, as in existing image inpainting, motion inpainting entails propagating local motion into missing image areas. The propagated motion is then used to naturally fill up missing image areas, even for scene regions that are non-planar and/or dynamic. Using the propagated local motion as a guide, image data from neighboring frames are locally warped to maintain spatial and temporal continuities for the stitched images. Image warping based on local motion has been used for de-ghosting. However, the approaches described herein propagate the local motion into area(s) where the local motion cannot be directly computed in order to fill up missing image areas.

In another example implementation, motion deblurring is employed to address the problem of motion blur that appears in stabilized videos. Although motion blur in original videos may look natural, it becomes annoying noise in stabilized videos because it does not match the compensated camera motion. Furthermore, mosaicing without appropriate deblurring can result in inconsistent stitching of blurry images with sharp images. To address this issue, a deblurring approach that does not require accurate point spread functions (PSFs), which are often hard to obtain, is described.

Thus, instead of estimating PSFs, motion deblurring as described herein involves the transfer of sharper pixels from one or more image frames to corresponding blurry pixels in another image frame. This can increase the overall sharpness, as well as generate a video of consistent sharpness. A described implementation of motion deblurring entails transferring pixels from sharper image frames to replace less sharp pixels of a current image frame using a weighted interpolation that is responsive to relative blurriness and alignment error.

This written description is separated into three additional sections. A first section references FIGS. 1-7 and is entitled "Example Qualitative Implementations for Video Enhancement". A second section references FIGS. 8-17 and is entitled "Example Quantitative Implementations for Video Enhancement". There is also a third section that references FIG. 18 and is entitled "Example Operating Environment for Computer or Other Device".

EXAMPLE QUALITATIVE IMPLEMENTATIONS FOR VIDEO ENHANCEMENT

FIG. 1 illustrates example results of three different approaches to enhancing images of a video. An original captured video sequence (not explicitly shown) is initially unstabilized due to shaky motion of the camera during recording. A stabilized image sequence 102 is shown in which each image frame is aligned with respect to one or more other image frames of the sequence. The uniformly grey portions on some of the outer edges of the stabilized image frames represent missing image portions.

Stabilized image sequence 102 can undergo an image enhancement 101, 103, or 104. Thus, for the illustrated image enhancement of FIG. 1, image enhancement is applied after the image stabilization. However, image enhancement may alternatively be considered to embrace or include image stabilization.

Three enhanced image frames 101, 103, and 104 are illustrated in the bottom half of FIG. 1. The left image frame represents an example of a conventional trimming (and scaling) approach 101. As is apparent, the motion of the camera causes only a central image square to remain as the common picture area after the trimming. After scaling the central image square to the original picture size (not shown), the image resolution is consequently decreased. Additionally, blockiness may result and/or the aspect ratio may be corrupted.

The middle image frame represents an example of a conventional straightforward mosaicing approach 103. As is apparent, particularly from an upper segment of the image frame especially in the region around the adult's head, straightforward mosaicing can result in effects that are very visually-disruptive. For instance, the top of the head of the adult is misaligned with respect to the bottom of the adult's head.

The right image frame represents an example of one or more described video enhancement approaches 104. As illustrated in FIG. 1 for the described approach 104, image enhancement 104 includes both video completion and image frame deblurring. However, a given image frame and/or video sequence may be subjected to one but not the other. Neither trimming nor scaling (as in image enhancement 101) is effectively necessary using the described video completion approaches 104. Moreover, the misalignment from straightforward mosaicing (as in image enhancement 103) is significantly reduced if not eliminated by the described video completion approaches 104.

Figure 2:
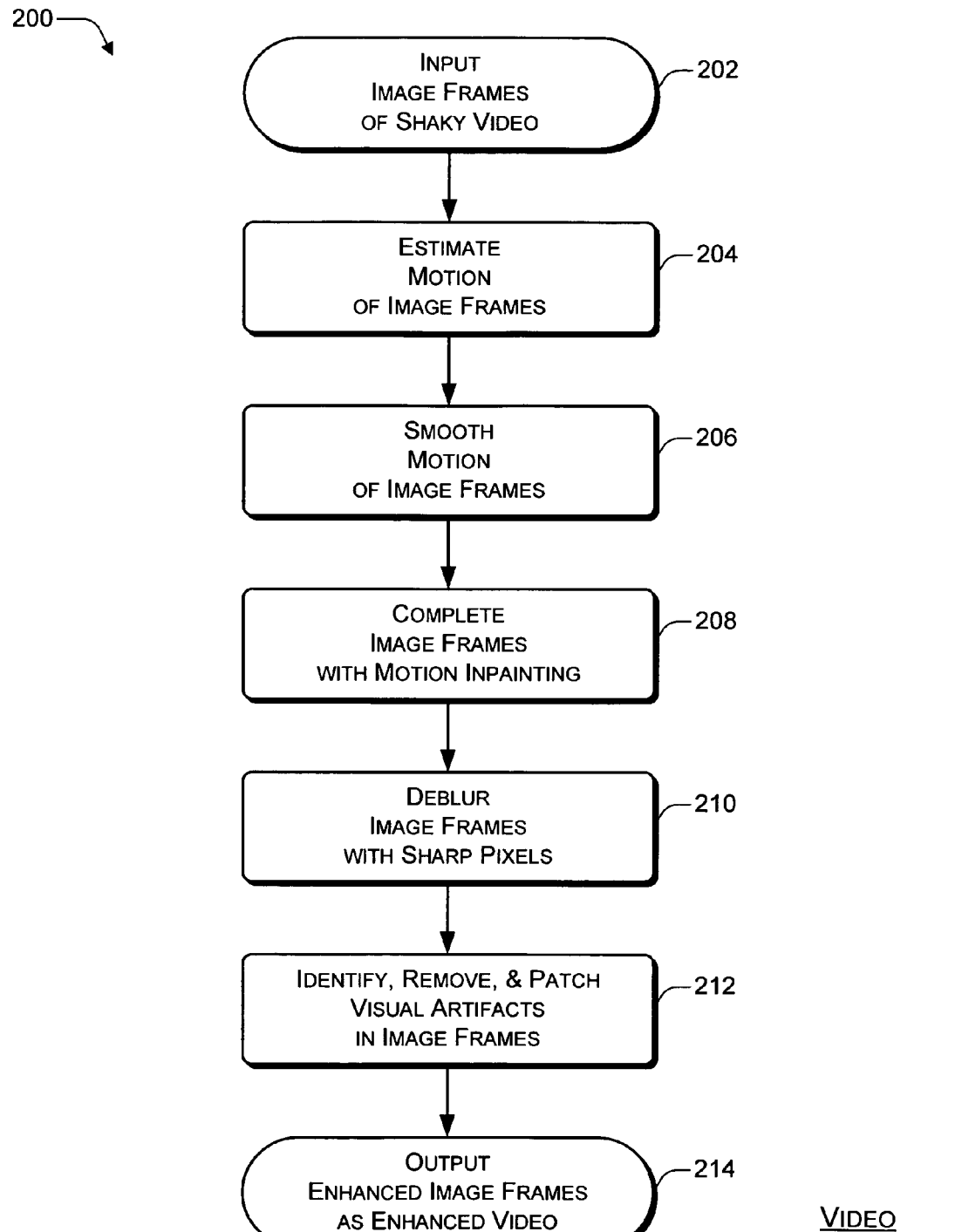
FIG. 2 is a flow diagram that illustrates an example of a method for enhancing a video.

FIG. 2 is a flow diagram 200 that illustrates an example of a method for enhancing a video. The blocks of FIG. 2 can represent logic modules, phases of a procedure, actions of a method, and so forth. However, the blocks of flow diagram 200 are described herein with particular reference to FIG. 2 in terms of actions of a method. Flow diagram 200 includes five (5) "core" blocks 204-212 and two (2) "ancillary" blocks 202 and 214.

The actions of flow diagram 200 may be performed in many possible environments and with a variety of hardware, firmware, and software combinations. For example, they may be performed (i) by a mobile device (e.g., a mobile phone, personal digital assistant (PDA), etc.), by a camcorder, by a personal computer, etc. and (ii) in real-time or off line. Also, some of the processing may be performed in real-time (e.g., by a device acquiring the video) while other parts of the processing are reserved for offline performance (e.g., by a more powerful computing device). Additional example environments and devices are described herein below, especially in the section entitled "Example Operating Environment for Computer or Other Device".

At block 202, a shaky video having multiple image frames is input. For example, the shaky video may be input to a device, a module, a process, or some other component. At block 204, the motion of the multiple image frames is estimated. At block 206, the estimated motion of the multiple image frames is smoothed. Smoothing the motion of the multiple image frames produces a stabilized image sequence.

At block 208, the multiple image frames (of the stabilized image sequence) are completed with motion inpainting. At block 210, each image frame of the multiple completed image frames are deblurred with sharp pixels from other image frames. In any given implementation, video completion or image deblurring or both may be applied to stabilized image frames.

At block 212, visual artifacts (if any) may be identified, removed, and patched (i.e., corrected) in the image frames. The action(s) of this optional block may be utilized to ameliorate such artifacts as, for example, overlaid alphanumeric characters, a network logo, marks resulting from smudges/scratches on a camera lens or defects of a CCD, and so forth. At block 214, the enhanced image frames are output as enhanced video.

The actions of blocks 204, 206, 208, 210, and 212 are described further below in this section with particular reference to the following respective subsections: "Qualitative Motion Estimation" (and FIG. 3 that relates thereto), "Qualitative Motion Smoothing" (and FIG. 4 that relates thereto), "Qualitative Video Completion" (and FIG. 5 that relates thereto), "Qualitative Image Deblurring" (and FIG. 6 that relates thereto), and "Qualitative Visual Artifact Amelioration" (and FIG. 7 that relates thereto).

Qualitative Motion Estimation

Figure 3:
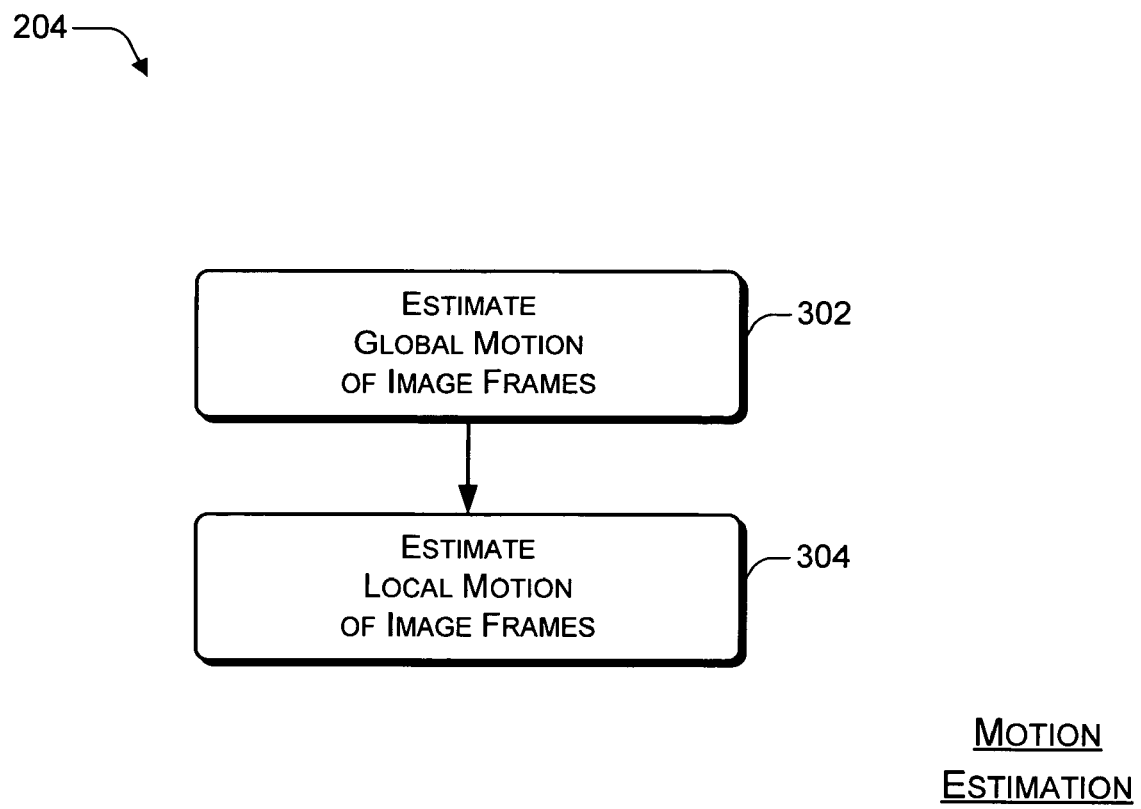
FIG. 3 is a flow diagram that illustrates an example of a method for estimating motion of a video.

FIG. 3 is a flow diagram 204 that illustrates an example of a method for estimating motion of a video. Flow diagram 204 includes two blocks 302 and 304. At block 302, global motion of the image frames of a video is estimated. At block 304, the local motion of the image frames of the video is estimated. The global motion may be estimated at sub-pixel accuracy to obtain a satisfactory match between and among image frames of a video sequence.

Global motion pertains to the transformation between consecutive image frames. The inter-frame motion estimation is accomplished by aligning consecutive frames using a global transformation. The transformation model may be, for example, translation plus rotation, affine, planar projective (perspective), some combination thereof, and so forth. The frame alignment may be effectuated in multi-resolution and iteratively. In a described implementation, the computation is performed at each step in coarse-to-fine fashion using a Laplacian image pyramid, but other approaches may alternatively be employed.

Qualitative Motion Smoothing

Figure 4A:
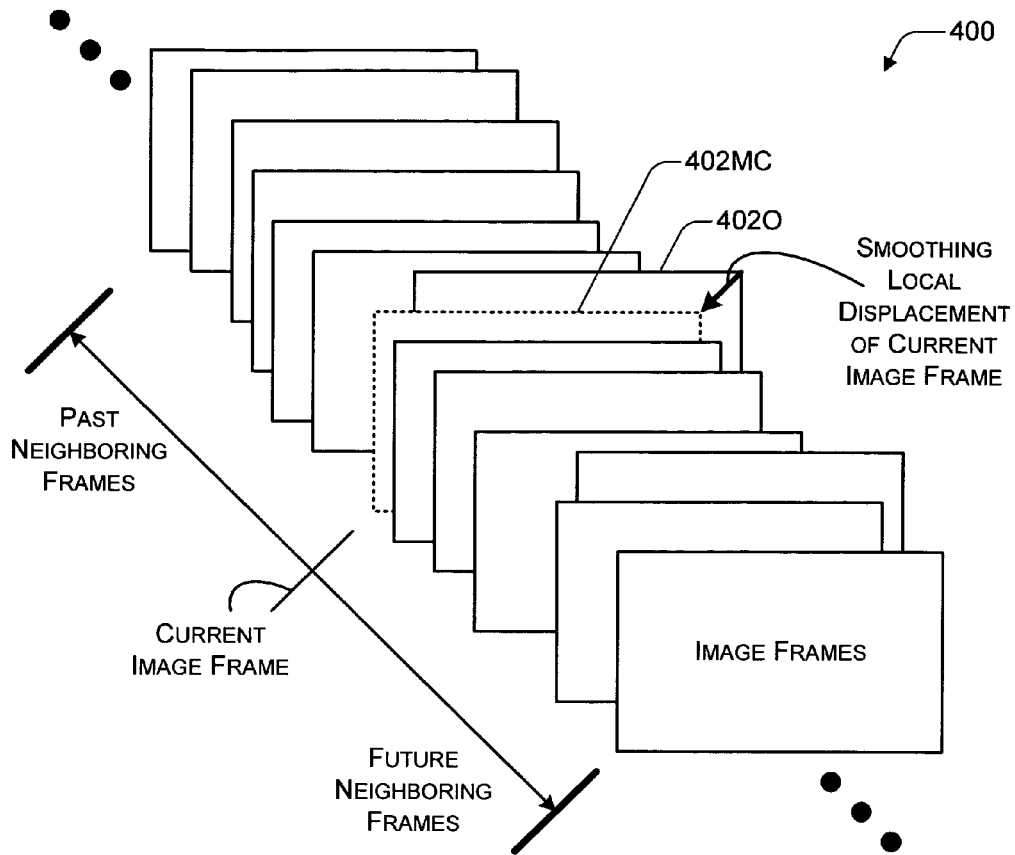
FIG. 4A is a block diagram illustrating an example of motion smoothing on a sequence of image frames.

FIG. 4A is a block diagram 400 illustrating an example of motion smoothing of a sequence of image frames. After the motion of a video sequence has been estimated, the motion may be smoothed to align image frames of the video sequence. Block diagram 400 includes a subset of the image frames of a video sequence. Specifically, the subset spans a local neighborhood of image frames around a current image frame that is being evaluated and having its position adjusted. The neighborhood around the current image frame spans a predetermined number of past neighboring frames and future neighboring frames.

An original position 402O of the current image frame is shown. The local displacement of the current image frame is smoothed as indicated by the motion-compensated position 402MC of the current image frame. Smoothing the estimated motion based on local displacement can avoid accumulation errors that can be prevalent with pre-existing approaches.

Figure 4B:
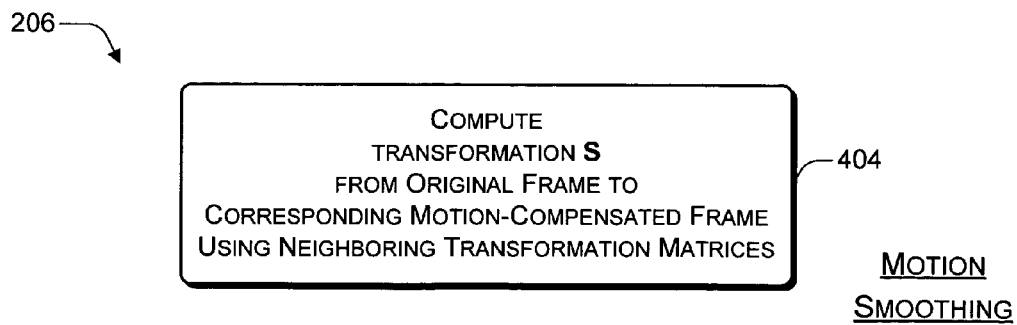
FIG. 4B is a flow diagram that illustrates an example of a method for motion smoothing of a video.

FIG. 4B is a flow diagram 206 that illustrates an example of a method for motion smoothing of a video. Flow diagram 206 includes one block 404. At block 404, a motion compensation transformation S from an original frame to a corresponding motion-compensated frame is computed using neighboring image frame motion transformation matrices. As described further herein below in the associated quantitative subsection, the computation may be performed, for example, using a Gaussian kernel and a convolution operation.

Qualitative Video Completion

Figure 5:
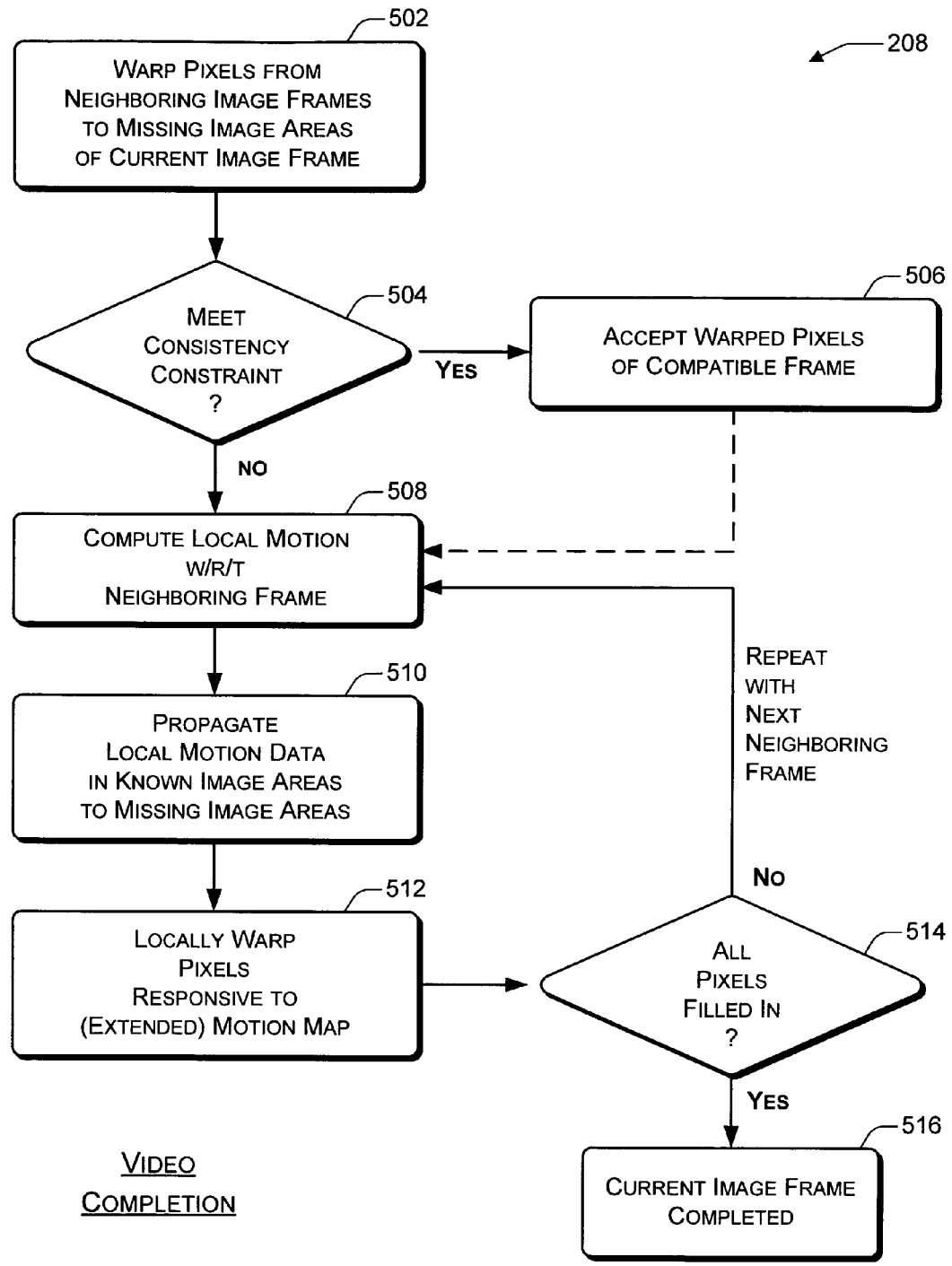
FIG. 5 is a flow diagram that illustrates an example of a method for video completion.

FIG. 5 is a flow diagram 208 that illustrates an example of a method for video completion. Flow diagram 208 illustrates motion inpainting to complete an image frame of a video sequence. Flow diagram 208 includes eight (8) blocks 502-516. It is applicable, for example, to a current image frame having missing area(s) after video stabilization.

At block 502, pixels from neighboring image frames are warped to missing image areas of a current image frame. For example, for a predetermined number of neighboring image frames, a pixel is warped to the current image frame from a corresponding pixel location.

At block 504, it is determined if the warped pixels collectively meet a consistency constraint. For example, a consistency value (e.g., a variance) is determined based on the warped pixel values, with the consistency value reflecting how much the warped pixels from the different neighboring image frames are similar. The determined consistency value is compared to a threshold consistency value. If the determined consistency value exceeds the threshold consistency value, the method continues at block 506. If the determined consistency value fails to exceed the threshold consistency value, the method continues at block 508.

At block 506, the value of the warped neighborhood pixels from a compatible frame is accepted. For example, the warped neighborhood pixels of the most compatible frame may be stored as the completed pixel value for the missing image area. The most compatible frame can be determined based on, for example, the frame that is the most temporally proximate to the current frame, the frame with the best inter-frame alignment error with respect to the current frame, some combination thereof, and so forth. The median value of warped neighborhood pixels may alternatively be used. The actions of blocks 502 through 506 are repeated for each of the pixels in the missing image area. When the missing image area has been analyzed with regard to warping multiple neighborhood image pixels and the consistency constraint, the method continues at block 508 as indicated by the dashed arrow line extending from block 506.

At block 508, local motion is computed with respect to a neighboring frame. The neighboring frame may be selected, for example, based on inter-frame alignment error. The local motion may be computed to produce local motion data as described herein above in the subsection entitled "Qualitative Motion Estimation" and below in the associated quantitative subsection.

At block 510, local motion data is propagated from known image areas to missing image areas. For example, the local motion data of a motion map may be propagated from the boundary of known image areas into the missing image areas. The propagation of the local motion data produces a (e.g., optical) flow field or motion map in the missing image areas by extending the flow field or motion map from known image areas into missing image areas. Thus, the local motion data of a motion map can be produced over all of the area of the new stabilized frame, including those areas that are not covered by the motion map in the original frame.

At block 512, pixels are locally warped from the selected neighboring image frame responsive to the (extended) motion map. For example, both the global transformation matrix between the two image frames and the local motion map are applied to a pixel in the selected neighboring image frame to produce a corresponding pixel for the current image frame.

At block 514, it is determined if all pixels are filled in for the current image frame. If not, then the method continues at block 508 so as to repeat the actions of blocks 508-512 with a different (e.g., the next) neighboring image frame. When all the pixels are filled in, video completion for the current image is completed at block 516. Small numbers of remaining unfilled pixels may also be filled in using another technique, such as filter blurring, diffusion, and so forth.

Qualitative Image Deblurring

Figure 6:
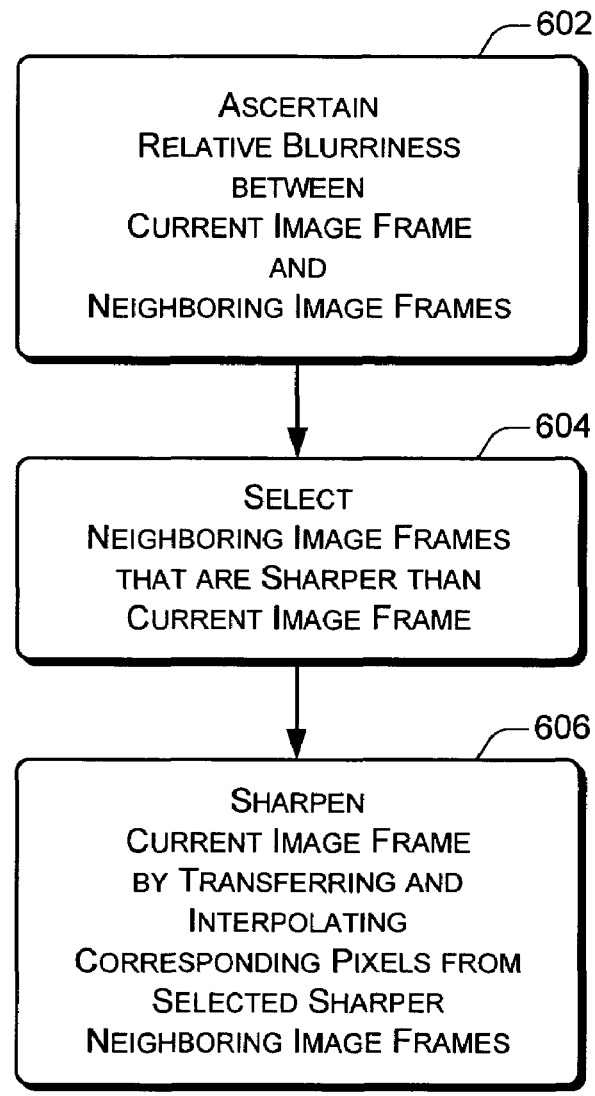
FIG. 6 is a flow diagram that illustrates an example of a method for video deblurring.

FIG. 6 is a flow diagram 210 that illustrates an example of a method for video deblurring. Flow diagram 210 illustrates the transfer of relatively sharper pixels from neighboring image frames to a current image frame of a video sequence. Flow diagram 210 includes three (3) blocks 602-606. It is applicable, for example, to a current image frame after video stabilization, and optionally after video completion.

At block 602, a relative blurriness measure between a current image frame and each neighboring image frame of multiple neighboring image frames is ascertained. An example relative blurriness measure is described herein below in the subsection entitled "Quantitative Image Deblurring"; however, other relative (or absolute) blurriness/sharpness measures may alternatively be employed.

At block 604, those neighboring image frames that are relatively sharper than the current image frame are selected. For example, if 12 neighboring image frames are considered (e.g., six in each of the forward and backward directions), seven of the 12 neighboring image frames may be sharper than the current image frame, so those seven are selected.

At block 606, the current image frame is sharpened by transferring and interpolating corresponding pixels from the selected sharper neighboring image frames to the current image frame. For example, corresponding pixels from those seven less blurry neighboring image frames may be transferred with a weighting that is responsive to an alignment error and/or to the relative blurriness measure.

Qualitative Visual Artifact Amelioration

Figure 7:
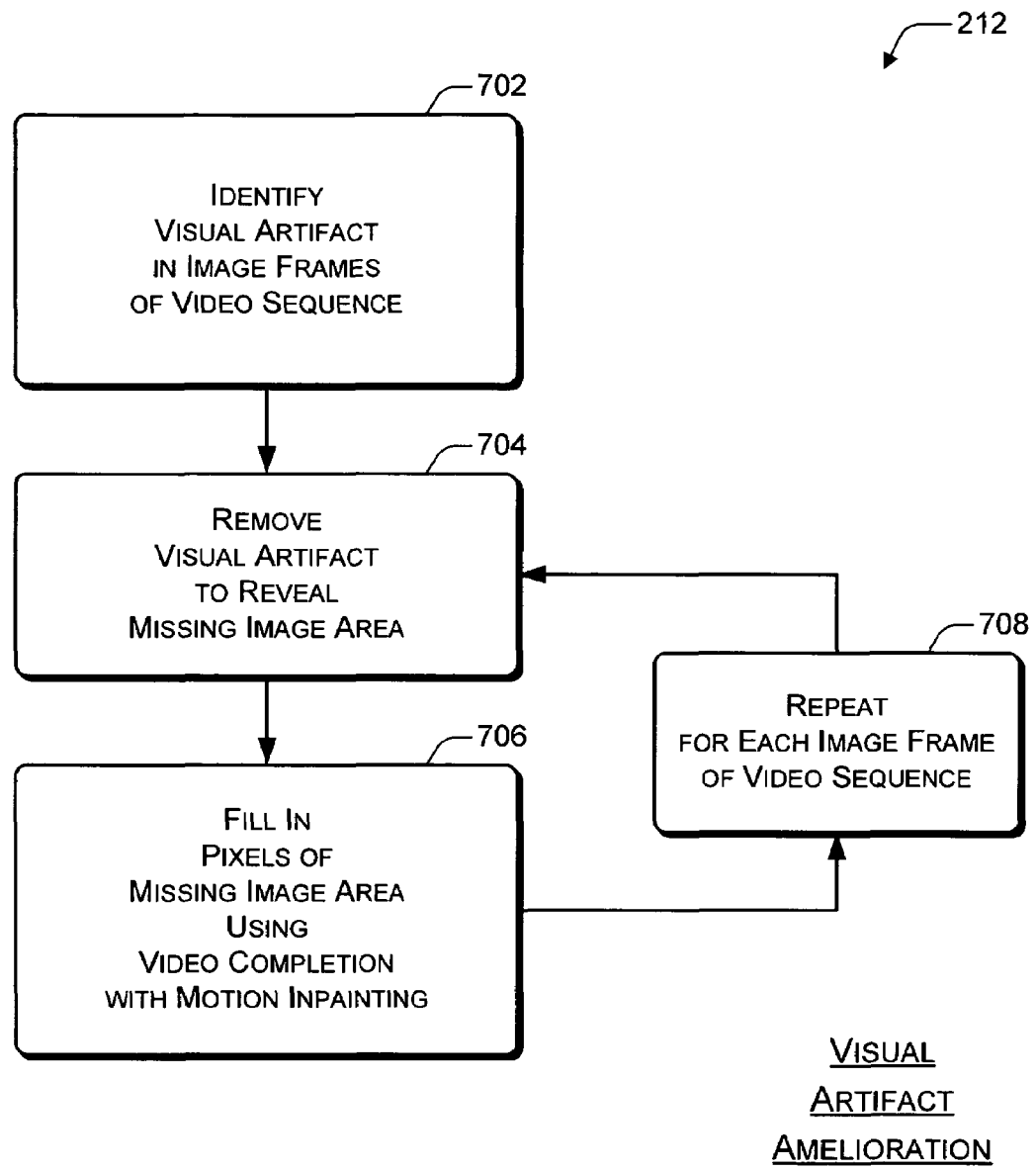
FIG. 7 is a flow diagram that illustrates an example of a method for artifact amelioration.

FIG. 7 is a flow diagram 212 that illustrates an example of a method for artifact amelioration. Visual artifact amelioration may be applied to video sequences that have been stabilized, completed, and/or deblurred. Alternatively, visual artifact amelioration may be applied to an original or raw video sequence or one that has been otherwise enhanced. Flow diagram 212 includes four (4) blocks 702-708.

At block 702, at least one visual artifact is identified in the image frames of a video sequence. For example, the visual artifact may be identified manually (e.g., by direct user indication) or automatically (e.g., based on an optional video enhancement setting of a program or a user menu/keyboard command). If identified manually, it may be marked with a pointer icon under the control of a mouse or similar input device. If identified automatically, it may be identified by detecting that pixels at a fixed pixel location across multiple image frames (i) have a constant color or intensity value and/or (ii) have a value that is different from nearby pixels at a constant delta while other pixels in the image frames have (i) changing values and/or (ii) values with varying deltas, respectively. Other pixel characteristics may alternatively be used with an automatic identification of the visual artifact.

At block 704, the identified visual artifact is removed from an image frame to reveal or create a missing image area. At block 706, the pixels of the revealed missing image area are filled in using a video completion technique that involves motion inpainting. Motion inpainting is described herein at the subsections entitled "Qualitative Video Completion" (above) and "Quantitative Video Completion" (below).

Hence, pixels of the missing image area, which is created upon the removal of the identified visual artifact, are replaced with pixels warped from a neighboring image frame responsive to an extended motion map, with the extended motion map being created by propagating motion data from known image areas to unknown image areas. At block 708, the actions of blocks 704 and 706 are repeated for each affected image frame of the video sequence.

EXAMPLE QUANTITATIVE IMPLEMENTATIONS FOR VIDEO ENHANCEMENT

The description in this section is directed to example quantitative implementations for video enhancement. Although some examples are relatively specific for the sake of increased clarity, actual implementations may be implemented in many different manners. This quantitative section includes the following subsections: "Quantitative Motion Estimation", "Quantitative Motion Smoothing", "Quantitative Video Completion", "Quantitative Image Deblurring", "Video Completion Results", "Quantitative Visual Artifact Amelioration", and "Quantitative Conclusion".

Quantitative Motion Estimation

This subsection describes motion estimation methods that can be used in the described deblurring and completion mechanisms. First, a method to estimate interframe image transformation, or global motion, is described. Local motion that deviates from the global motion is estimated separately and described second. The global motion is used for two purposes: stabilization and image deblurring. The local motion is used for video completion. The following subsection (entitled "Quantitative Motion Smoothing") describes a motion smoothing algorithm, which is relevant to stabilizing global motion.

Global Motion Estimation:

We first explain a method of estimating global motion between consecutive images. In the case that a geometric transformation between two images can be described by a homography (or 2D perspective transformation), the relationship between two overlapping images $I(p)$ and $I'(p')$ can be written by $p \sim Tp'$. $p=(x, y, 1)^T$ and $p'=(x', y', 1)^T$ are pixel locations in projective coordinates, and $\sim$ indicates equality up to scale since the (e.g., 3×3) matrix T is invariant to scaling.

Global motion estimation is performed by aligning pairwise adjacent frames assuming a geometric transformation. In a described method, an affine model is assumed between consecutive images. By way of example only, we employ the hierarchical motion estimation framework proposed by Bergen et al. [J. R. Bergen, P. Anandan, K. J. Hanna, and R. Hingorani, "Hierarchical model-based motion estimation," in *Proc. of 2nd European Conf. on Computer Vision,* 1992, pp. 237-252.]. By applying the parameter estimation for every pair of adjacent frames, a global transformation chain is obtained.

Throughout this quantitative section, we denote the pixel location in the image coordinate $I_t$ as $p_t$. The subscript t indicates the index of the frame. We also denote the global transformation $T_t^j$ to represent the coordinate transform from frame i to j. Thus, the transformation of image $I_t$ to the $I_{t-1}$ coordinate can be described as $I_t(T_t^{t-1}p_t)$. The transformation T describes the coordinate transform; hence, $I_{t-1}(T_t^{t-1}p_t)$ has the pixel values of frame t−1 in the coordinates of frame t.

Local Motion Estimation:

Local motion describes the motion which deviates from the global motion model. For example, local motion relates to the motion of moving objects, image motion due to non-planar scenes, some combination thereof, and so forth. In a described implementation, local motion is estimated by computing optical flow between frames after applying a global transformation; however, the computed optical flow is derived from the common coverage areas between the frames.

By way of example only, a pyramidal version of the Lucas-Kanade optical flow computation [J. Y. Bouguet, "Pyramidal implementation of the Lucas-Kanade feature tracker: description of the algorithm," *OpenCV Document, Intel, Microprocessor Research Labs*, 2000.] is applied to obtain the optical flow field. The optical flow field $F_t^{t'}(p_t) = [u(p_t) v(p_t)]^t \cdot F_t^{t'}(p_t)$ represents an optical flow from frame $I_t(P_t)$ to $I_{t'}(T_{t'}^t p_t')$. The vector components u and v represent the flow vector along the x- and y-direction, respectively, in $p_t$ coordinates.

Quantitative Motion Smoothing

This subsection describes how the undesired motion is removed. A stabilized motion path is obtained by removing the undesired motion fluctuation. It is assumed that the intentional motion in the video is usually slow and smooth. We therefore define the high frequency component in the global motion chain as the unintentional motion.

Previous motion smoothing methods attempt to smooth out the transformation chain itself or the cumulative transformation chain with an anchoring frame. In a described implementation, on the other hand, the motion of image frames is smoothed by smoothing local displacement.

With conventional approaches, when smoothing is applied to the original transformation chain $T_0^1 \ldots T_{i-1}^i$ as it is done in pre-existing works, a smoothed transformation chain $\tilde{T}_0^1 \ldots \tilde{T}_{i-1}^i$, is obtained. In this case, a motion compensated frame $I_i'$ is obtained by transforming $I_i$ with $\Pi_{n=0}^i T_{n+1}^n \tilde{T}_n^{n+1}$. Unfortunately, the resulting cascade of the original and smoothed transformation chain often generates accumulation error.

In contrast, implementations as described herein are relatively free from accumulative error because described techniques locally smooth displacement from a current frame to neighboring frames. Instead of smoothing out the original transformation chain along the video frame sequence, we directly compute the transformation S from one frame to the corresponding motion-compensated frame using neighboring transformation matrices.

Figure 8:
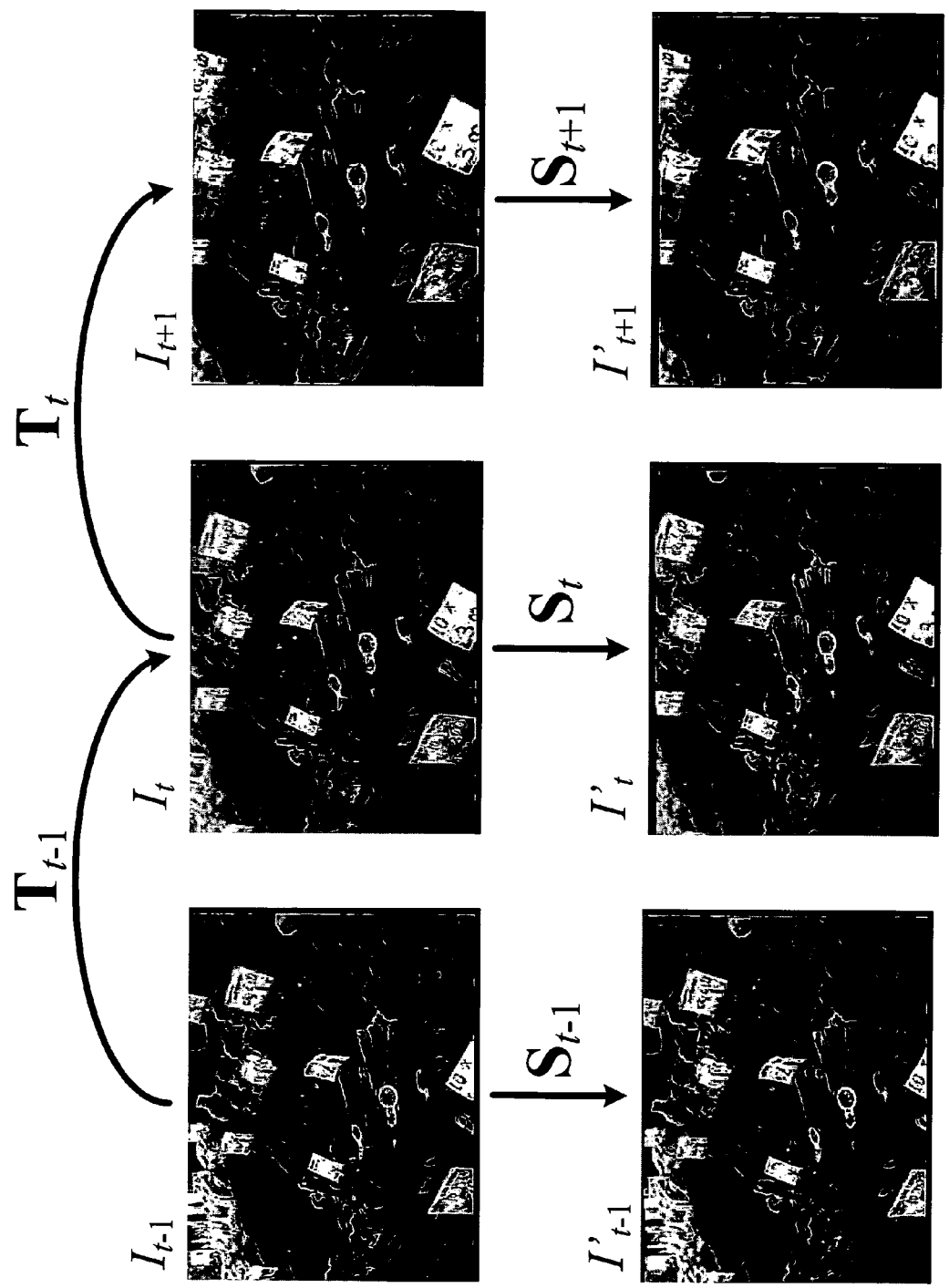
FIG. 8 illustrates an original frame sequence and an example of a motion-compensated frame sequence.

FIG. 8 illustrates an original frame sequence (top row) and a motion-compensated frame sequence (bottom row). The illustrated portion of the original frame sequence includes frames $I_{t-1}$, $I_t$, and $I_{t+1}$. The illustrated portion of the motion-compensated frame sequence includes frames $I'_{t-1}$, $I'_t$, and $I'_{t+1}$. Two transformation vectors $T_{t-1}$ (from $I_{t-1}$ to $I_t$) and $T_t$ (from $I_t$ to $I_{t+1}$) of a transformation chain T are also shown. The transformation from the original path to the smoothed path S ( . . . , $S_{t-1}$, $S_t$, $S_{t-1}$, . . . ) is shown for each of the three image frame pairs.

We denote the indices of neighboring frames as $N_t = \{j | t-k <= j <= t+k\}$. It is assumed that frame $I_t$ is located at the origin, aligned with the major axes. We can calculate the position of each neighboring frame $I_s$, relative to frame $I_t$, by the local displacement $T_t^s$. We seek the correcting transformation S from the original frame $I_t$ to the motion-compensated frame $I'_t$ according to $$S_t = \sum_{i \in N_t} T_t^i * G(k), \quad (1)$$

where $$G(k) = \frac{1}{\sqrt{2\pi}\sigma} e^{-k^2/2\sigma^2}$$

is a Gaussian kernel, the * operator represents convolution, and $\sigma = \sqrt{k}$ is used. Using the obtained matrices $S_0, \ldots, S_t$, the original video frames can be warped to the motion-compensated video frames by $$I'_t(p'_t) \leftarrow I_t(S_t p_t). \quad (2)$$

Figure 9:
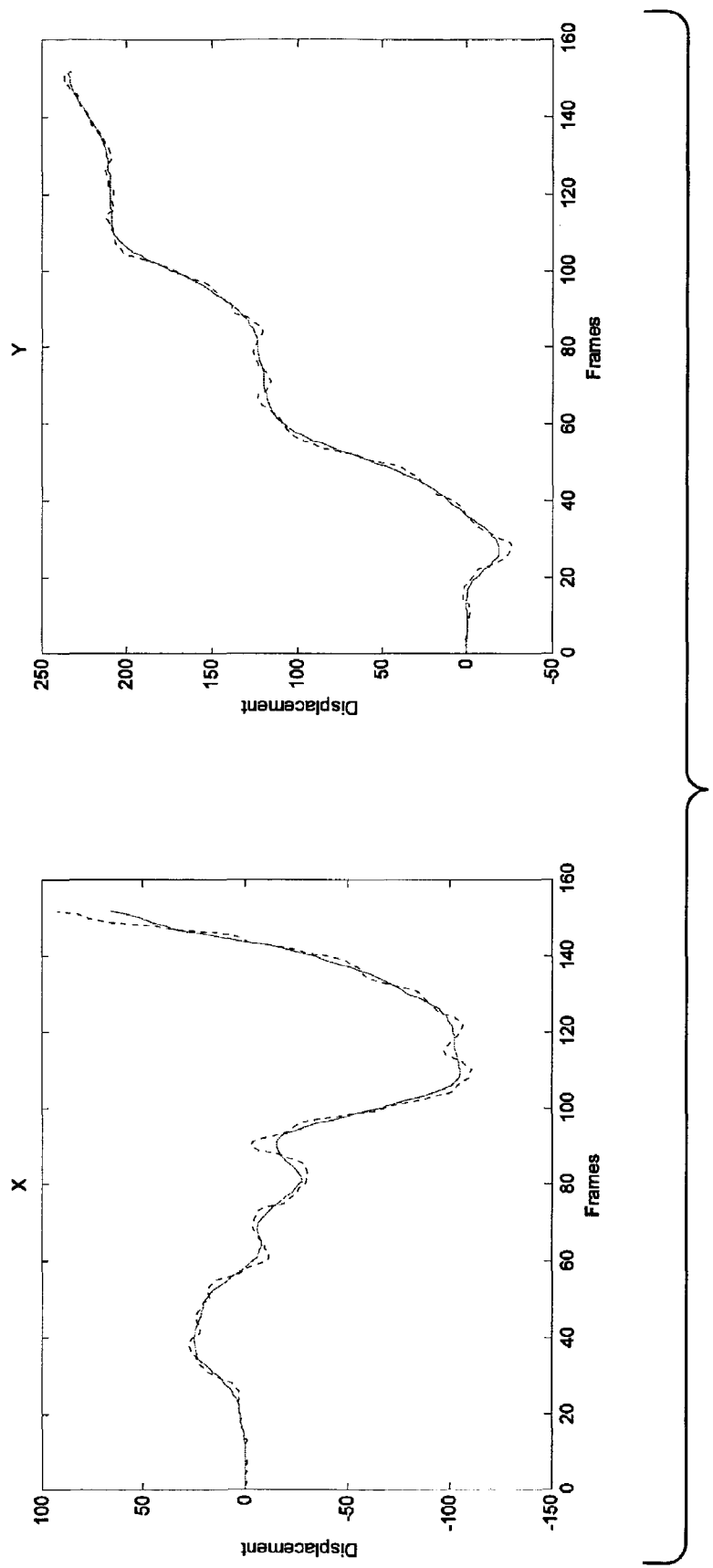
FIG. 9 illustrates two example graphs that illustrate an original motion path and a smoothed motion path for each of the x and y directions.

FIG. 9 includes two example graphs that illustrate an original motion path (the dashed line) and a smoothed motion path (the solid line) for each of the x and y directions. The solid lines show the result of the described motion smoothing technique with k=6 in Eq. (1). In FIG. 9, x- and y-translation elements of the camera motion path are displayed.

As is visibly apparent, abrupt displacements which are considered to be unwanted camera motion are well reduced by the described motion smoothing. The smoothness of the new camera motion path can be controlled by changing k, with a larger k yielding a smoother result. Experiments indicate that annoying high frequency motion is well removed by setting k=6 (e.g., about 0.5 seconds with NTSC). However, the variable k can be increased when a smoother video is preferred (or decreased, e.g., for reduced computational demands and/or for a faster response in a real-time implementation).

Quantitative Video Completion

In a described implementation for video completion, image mosaics are locally adjusted using a local motion field in order to obtain relatively seamless stitching of the mosaics in the missing image areas. Specifically, motion inpainting is utilized to propagate the local motion field into the missing image areas where local motion cannot be directly computed. An underlying assumption is that the local motion in the missing image areas is similar to that of adjoining image areas.

Figure 10:
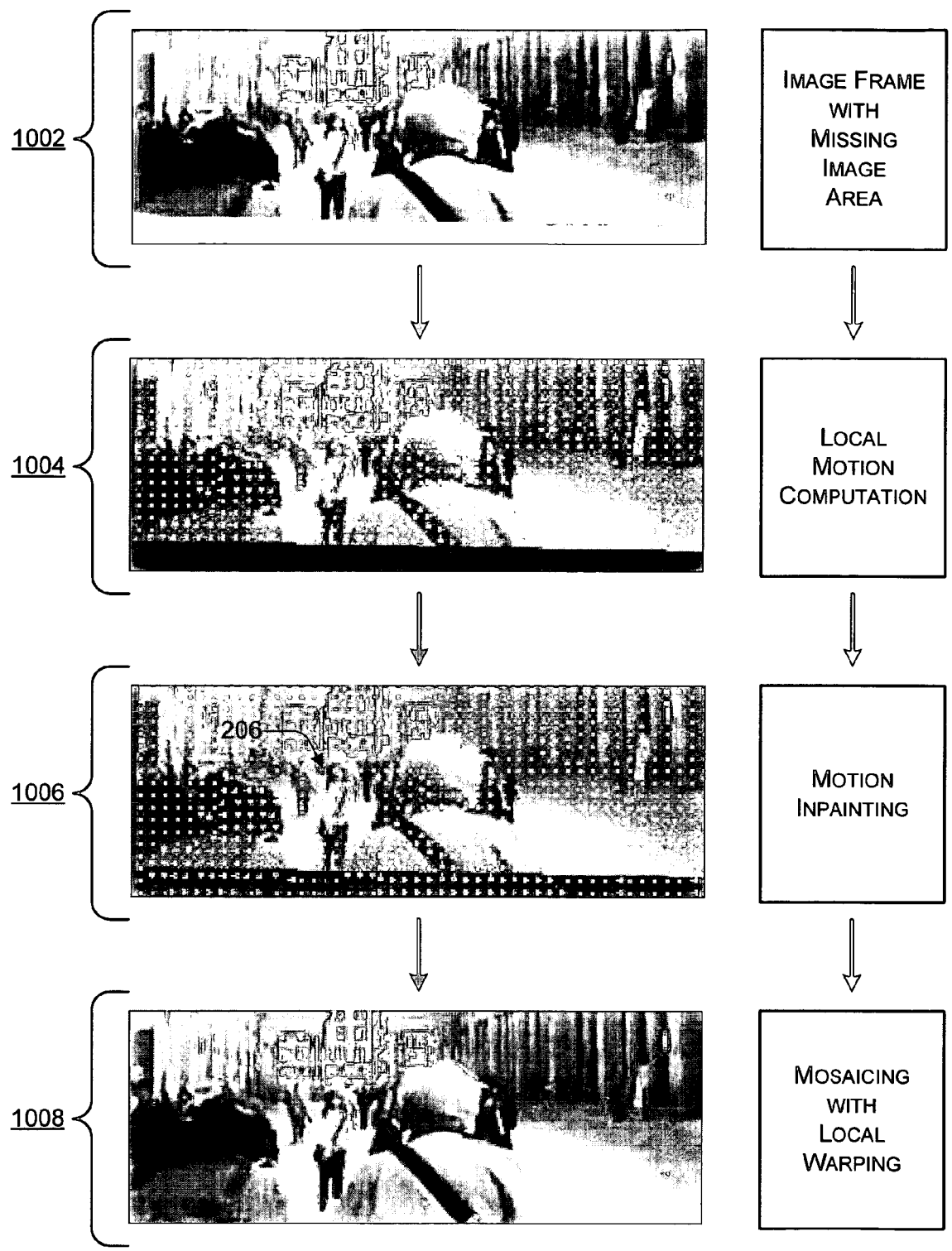
FIG. 10 is an example of a visual and textual video completion flow diagram.

FIG. 10 is an example of a visual and textual video completion flow diagram 1000. Flow diagram 1000 illustrates an example algorithm for video completion and includes four (4) phases 1002-1008. At phase 1002, the image frame with at least one missing image area is established. In this example the image frame has a missing image area due to video stabilization.

At phase 1004, local motion from a neighboring frame is estimated over the common coverage image area. For example, local motion may be computed between a current image frame and a neighboring image frame for at least approximately overlapping region(s). At phase 1006, the local motion field is then propagated into missing image areas to effectuate motion inpainting. Thus, instead of propagating color as in pre-existing image inpainting, the local motion is propagated for motion inpainting. At phase 1008, the propagated local motion is used as a guide to locally warp image mosaics. This can achieve a smooth stitching of the image mosaics.

An example of this video completion algorithm is described somewhat more rigorously in the following paragraphs of this subsection. The following terminology is used: Let $M_t$ be the missing pixels, or undefined image pixels, in the frame $I_t$. We wish to complete $M_t$ for every frame t while maintaining visually plausible video quality.

Mosaicing with Consistency Constraint:

In a preliminary or initial phase of video completion, we attempt to cover the static and planar part of the missing image area by mosaicing in conjunction with an evaluation of the validity of the mosaic results. When the global transformation is correct and the scene in the missing image area is static and planar, mosaics generated by warping from different neighboring frames should be consistent with each other in the missing area. Therefore, it is possible to evaluate the validity of the mosaic by testing the consistency of the multiple mosaics that cover the same pixels but that are derived from multiple corresponding neighboring frames.

We use the variance of the mosaic pixel values to measure the consistency; when the variance is high, the mosaic is less reliable at a given pixel. For each pixel $p_t$ in the missing image area $M_t$, the variance of the mosaic pixel values is evaluated by $$v_t(p_t) = \frac{1}{n-1} \sum_{t' \in N_t} \left[ I_{t'}(T_t^{t'} p_t) - \bar{I}_{t'}(T_t^{t'} p_t) \right]^2, \quad (3)$$

where $$\bar{I}_{t'}(T_t^{t'} p_t) = \frac{1}{n} \sum_{t' \in N_t} I_{t'}(T_t^{t'} p_t), \quad (4)$$

and n is the number of neighboring frames. For color images, we use the intensity value of the pixel; the intensity may be computed, e.g., by 0.30R+0.59G+0.11B. A pixel $p_t$ is filled in by the median of the warped pixels when the computed variance is lower than a predefined threshold T:

$$I_t(p_t) = \begin{cases} \text{median}_{t'}(I_{t'}(T_t^{t'} p_t)) & \text{if } v_t < T \\ \text{keep it as missing} & \text{otherwise.} \end{cases} \quad (5)$$

If all missing pixels $M_t$ are filled in with this initial constrained mosaicing phase, the following phases can be skipped, and the next image frame may be addressed.

Local Motion Computation:

In this first phase, each neighboring frame $I_{t'}$ is assigned a priority to be processed based on its alignment error. Usually, it is observed that the nearer frame shows a smaller alignment error. The nearer frame therefore typically has a higher processing priority. The alignment error is computed using the common coverage area of $I_t(p_t)$ and $I_{t'}(T_t^{t'} p_t)$ by $$e_{t'}^t = \sum_{p_t} |I_t(p_t) - I_{t'}(T_t^{t'} p_t)|. \quad (6)$$

Local motion may be estimated as described herein above in the subsection entitled "Quantitative Motion Estimation" or by another local-motion-estimating technique.

Motion Inpainting:

In this second phase of video completion, the local motion data in the known image areas is propagated into the missing image areas. The propagation starts at pixels on the boundary of the missing image area. Using motion values of neighboring known pixels, motion values in the missing image area M at the boundary are defined, and the boundary therefore gradually advances into the missing area M until it is completely filled in.

Figure 11:
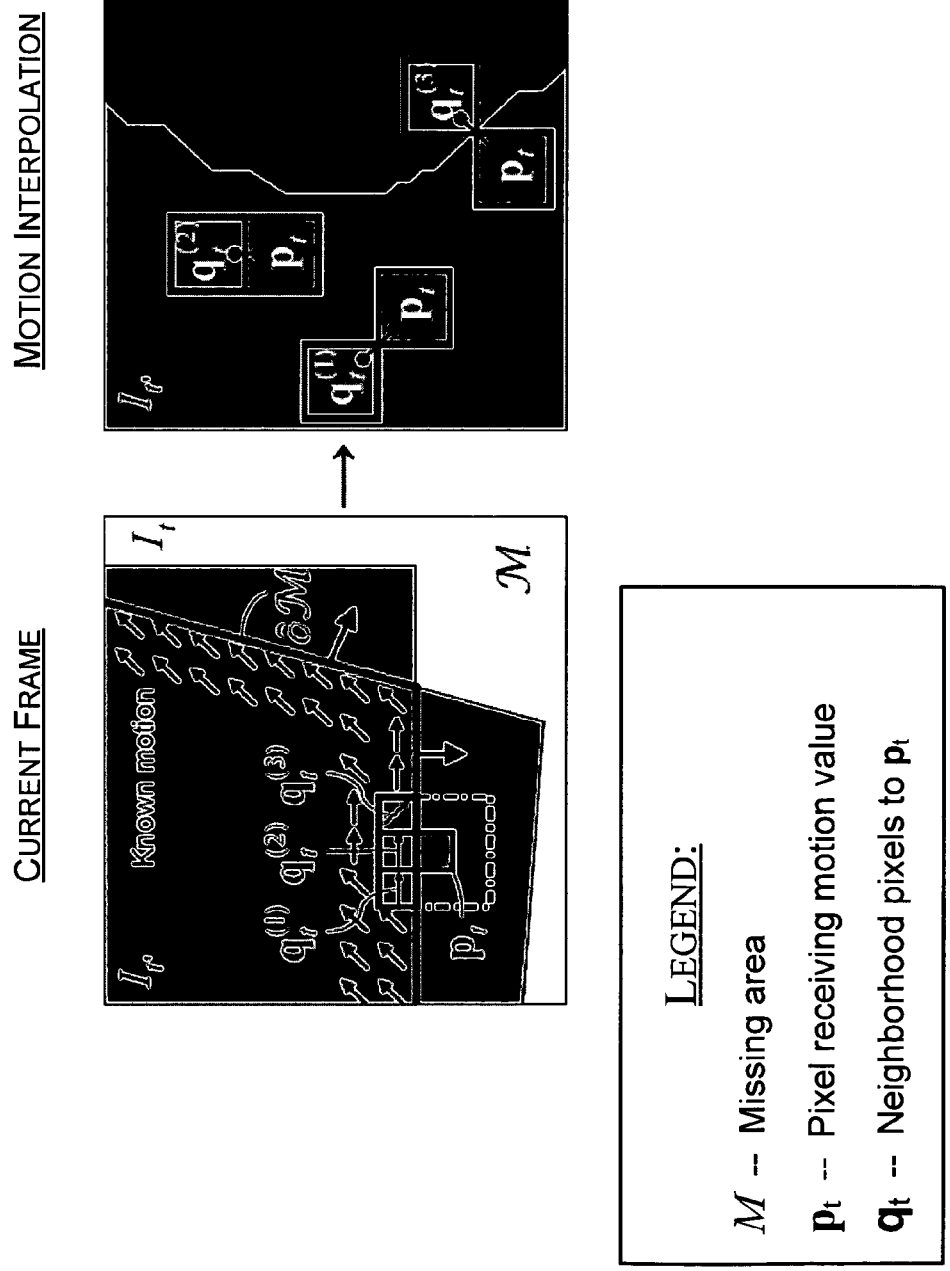
FIG. 11 illustrates an example of motion inpainting for video completion at a pixel level.

FIG. 11 illustrates an example of motion inpainting for video completion at a pixel level. The current frame indicates the missing area M along with the pixel $p_t$ that is to receive a motion value based on multiple neighborhood pixels $q_t$. For motion inpainting, the motion field is propagated on the advancing front $\partial M$ into M. The color similarities between $p_t$ and its neighbors $q_t$, are measured in the neighboring frame $I_{t'}$ after warping by the local motion of $q_t$, and they are used as weight factors for the motion interpolation.

Suppose $p_t$ is a pixel in a missing area M. Let $H(p_t)$ be the pixels of the neighborhood of $p_t$, that already have a defined motion value by either the initial local motion computation or prior extrapolation of motion data. The neighborhood pixels of a given pixel $p_t$ may be considered to be the eight adjacent pixels or some other definition may alternatively be used. The motion value for pixel $p_t$ is generated by a weighted average of the motion vectors of the pixels $H(p_t)$:

$$F_t^{t'}(p_t) = \frac{\sum_{q_t \in H(p_t)} w(p_t, q_t) F_t^{t'}(q_t)}{\sum_{q_t \in H(p_t)} w(p_t, q_t)}, \quad (7)$$

where $w(p_t, q_t)$ determines the contribution of the motion value of $q_t \in H(p_t)$ to pixel $p_t$. We use color similarity (or intensity similarity in the case of grayscale videos) as a measurement for motion similarity, assuming that neighboring pixels of similar colors belong to the same object in the scene, and thus they will likely move in a similar motion. Because the color of pixel $p_t$ is unknown in frame $I_t$, we use the neighboring frame $I_{t'}$ for the estimation of $w(p_t, q_t)$.

As illustrated in FIG. 11, $q_{t'}$ are first located in the neighboring image $I_{t'}$ using $q_t$ and their local motion. Using the geometric relationship between $q_t$ and $p_t$, $p_{t'}$ are tentatively determined in $I_{t'}$. Using $p_{t'}$ and $q_{t'}$, we measure the color similarity by $w(p_t, q_t) = 1/\{\text{ColorDistance}(I_{t'}(p_{t'}), I_{t'}(q_{t'})) + \in \}$, where $\in$ is a small value for avoiding division by zero. In this way, the weight factor is computed using the color similarity, and the motion value computed by Eq. (7) is assigned to $p_t$. The $l^2$-norm for the color difference in RGB space has been used for the sake of computational speed, but a different measure could alternatively be used.

In a described implementation, the actual scanning and composition in the missing area M is done using the Fast Marching Method. The FMM is introduced by J. A. Sethian [J. A. Sethian, *Level Set Methods: Evolving Interfaces in*

Geometry, Fluid Mechanics, Computer Vision and Materials Sciences, Cambridge Univ. Press, 1996.], and an example of the FMM being applied in the context of image inpainting is given by A. Telea [A. Telea, "An image inpainting technique based on the fast marching method," *Journal of Graphics Tools*, 9(1):23-34, 2004.].

Let $\partial M$ be the group of boundary pixels of the missing image area M (e.g., let $\partial M$ be pixels that have a defined neighbor). Using FMM, we are able to visit each undefined pixel only once, starting with pixels of $\partial M$, and advancing the boundary between defined and undefined pixels inside the missing image area M until the undefined pixels are assigned motion values (see FIG. 11). The pixels are processed in ascending distance order from the initial boundary $\partial M$, such that pixels close to the known area are filled first. The result of this process is a smooth extrapolation of the local motion flow to the undefined area in a manner that preserves object boundaries with color similarity measure.

Other mechanisms, instead of the FMM, may alternatively be used to propagate the local motion data into the missing image areas. For example, diffusion may also be used. With diffusion, however, a given pixel may be visited more than once before a motion value is assigned thereto.

Mosaicing with Local Warping:

In this third phase of video completion, after the optical flow field in the missing image area $M_t$ is obtained with motion inpainting (or more generally, after a motion map is extended into the missing image area), we use the optical flow field F as a guide to locally warp $I_{t'}$ in order to generate a smooth mosaic. Moving objects may also be included as part of the smooth mosaic.

$$I_t(p_t) \leftarrow I_{t'}(T_t^{t'}(F_t^{t'} p_t)). \tag{8}$$

If some missing pixels still exist in $I_t$, the algorithm returns to the first phase and uses the next neighboring frame to compute local motion over common areas.

After a second looping through of the first through the third phases, the missing pixels are usually all filled. However, it is possible that there still remain missing image pixels that are not covered by constrained mosaics (of the preliminary/initial phase) or warped mosaics (of the first-third phases). Such image areas are considered to be generally small; therefore, we simply apply a blur filter to fill up these small areas. Alternatively, richer methods such as non-parametric sampling or diffusion can be used to produce higher quality results than simple blurring for the final pixel completion, but the richer methods involve additional computational cost.

Quantitative Image Deblurring

After video stabilization, motion blur which is not associated with the new motion of the video frame sequence becomes a noticeable noise. Removing that noise can improve the visible appearance of the video. As noted herein above, it is usually difficult to obtain accurate PSFs from a free-motion camera; consequently, image deblurring using deconvolution is unsuitable for our purposes. In order to sharpen blurry frames without using PSFs, we developed and describe herein a new interpolation-based deblurring technique. In accordance with a described implementation of the interpolation-based deblurring technique, sharper image pixels are transferred from neighboring frames to corresponding blurry image pixels of a current image frame.

First, the "relative blurriness" of the image is evaluated. "Relative blurriness" represents how much of the high frequency component has been removed from the frame in comparison to the neighboring frames. Image sharpness, which is the inverse of blurriness, has been investigated in the field of microscopic imaging, where a premium is usually placed on accurate focus.

We use the inverse of the sum of squared gradient measure to evaluate the relative blurriness because of its robustness to image alignment error and its computational efficiency. By denoting two derivative filters along the x- and y-directions by $f_x$ and $f_y$, respectively, the blurriness measure is defined by $$b_t = \frac{1}{\sum_{p_t} \{((f_x * I_t)(p_t))^2 + ((f_y * I_t)(p_t))^2\}}. \tag{9}$$

This blurriness measure does not give an absolute evaluation of image blurriness, but it yields relative image blurriness among similar images when compared to the blurriness of other images. Hence, for this particular blurriness measure, we restrict the blurriness measure to be used in a limited number of neighboring frames where significant scene change is not observed. Also, the blurriness measure is computed using a common coverage area which is observed in the neighboring frames under consideration. Relatively blurry frames are determined by examining $b_t/b_{t'}$, $t' \in N_t$. When, for example, $b_t/b_{t'}$ is larger than 1, frame $I_{t'}$ is considered to be sharper than frame $I_t$. Inversely, when $b_t/b_{t'}$ is less than 1, frame $I_{t'}$ is considered to be less sharp or blurrier than frame $I_t$.

Once relative blurriness is determined, blurry frames are sharpened by transferring and interpolating corresponding pixels from sharper frames. To reduce reliance on pixels where a moving object is observed, a weight factor which is computed by a pixel-wise alignment error $E_{t'}^t$, from $I_{t'}$ to $I_t$ is used:

$$E_{t'}^t(p_t) = |I_{t'}(T_t^{t'} p_t) - I_t(p_t)|. \tag{10}$$

High alignment error is caused by either moving objects or error in the global transformation. Using the inverse of pixel-wise alignment error E as a weight factor for the interpolation, blurry pixels are replaced by interpolating sharper pixels. The deblurring can be described by $$\hat{I}_t(p_t) = \frac{I_t(p_t) + \sum_{t' \in N} w_{t'}^t(p_t) I_{t'}(T_t^{t'} p_t)}{1 + \sum_{t' \in N} w_{t'}^t(p_t)}, \tag{11}$$

where w is a weight factor that includes the pixel-wise alignment error $E_{t'}^t$ and relative blurriness $b_t/b_{t'}$, expressed as $$w_{t'}^t(p_t) = \begin{cases} 0 & \text{if } \frac{b_t}{b_{t'}} < 1 \\ \frac{b_t}{b_{t'}} \frac{\alpha}{E_{t'}^t(p_t) + \alpha} & \text{otherwise.} \end{cases} \tag{12}$$

$\alpha \in [0, \infty]$ controls the sensitivity on the alignment error. Thus, by increasing $\alpha$, the alignment error contributes less to the weight. As is apparent from the example weighting factor defined in Eq. (12), the interpolation of Eq. (11) uses pixels from frames that are sharper than the current frame while excluding pixels from those frames that are less sharp.

Figure 12A:
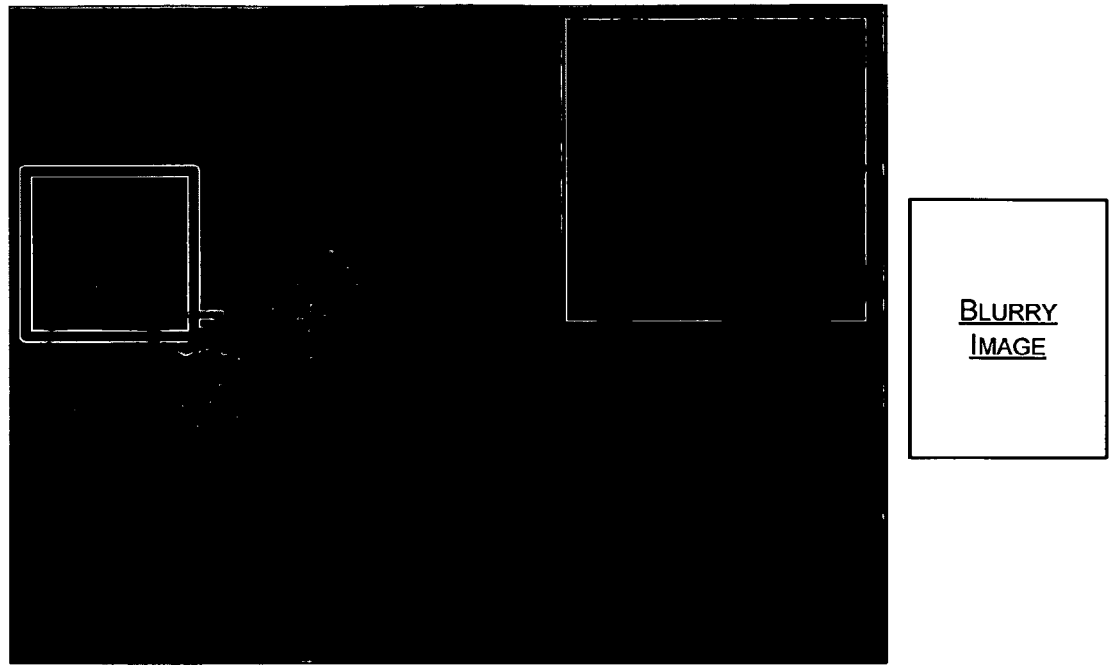
FIGS. 12A and 12B illustrate a first example image frame pair having a blurry image and a corresponding deblurred image, respectively.
Figure 12B:
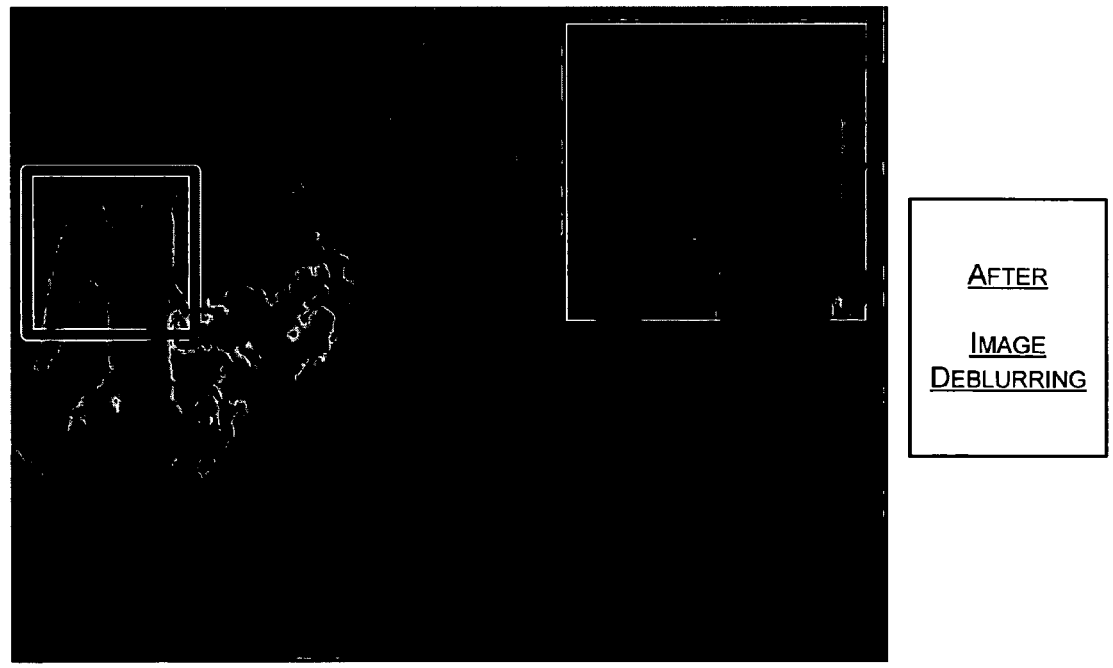
Figure 13A:
FIGS. 13A and 13B illustrate a second example image frame pair having a blurry image and a corresponding deblurred image, respectively.
Figure 13B:

FIGS. 12A, 12B, 13A, and 13B show example results of applying an implementation of the described image deblurring. Specifically, FIGS. 12A and 12B illustrate a first example image frame pair having a blurry image and a corresponding deblurred image, respectively. FIGS. 13A and 13B illustrate a second example image frame pair having a blurry image and a corresponding deblurred image, respectively. FIGS. 12A and 13A show frames with a blurry image, and FIGS. 12B and 13B show the frames after image deblurring.

FIG. 12A is a blurry version of an image frame, and FIG. 12B is a deblurred version of the image frame. FIG. 13A is a blurry version of another image frame, and FIG. 13B is a deblurred version of the other image frame. As is apparent from FIGS. 12 and 13, the blurry image frames (of FIGS. 12A and 13A) are well sharpened by the deblurring technique (as shown in FIGS. 12B and 13B). It is also observable that moving objects are well preserved without yielding ghost effects, which are often visible with simple frame interpolation methods. The absence of ghosting is at least partially due to the incorporation of a pixel-wise alignment error factor in the transfer and interpolation process.

Video Completion Results

Figure 14:
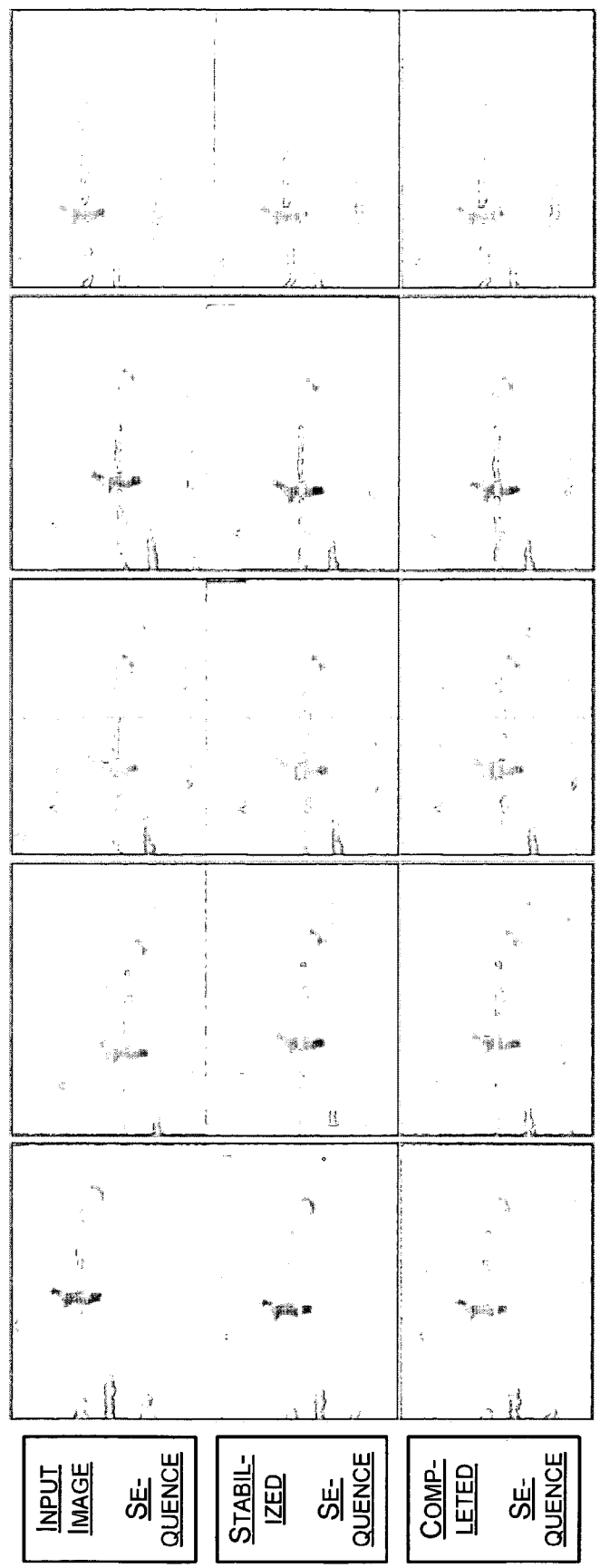
FIG. 14 illustrates an input image sequence and an example of a resulting stabilized image sequence along with a completed video sequence.

FIG. 14 illustrates an input image sequence and an example of a resulting stabilized image sequence along with a completed video sequence. The top row shows the original input video sequence with four image frames. The middle row shows the stabilized video sequence that still includes missing image areas. The missing image areas are represented by the uniformly light grey areas. The far left, first image frame of the middle row, for instance, includes missing image areas along the top and right side of the image frame. The bottom row shows the stabilized and completed video sequence. The grid that creates four rectangles per image frame is overlaid for better visualization.

It is apparent that the stabilized result of the middle row contains a significant amount of missing image areas. In the experiment that produces the results of FIG. 14, a 5×5 size filter h is used to perform motion inpainting. As shown in the bottom row, the missing image areas of the stabilized middle row sequence are naturally filled in using an implementation of the described video completion technique.

Figure 15A:
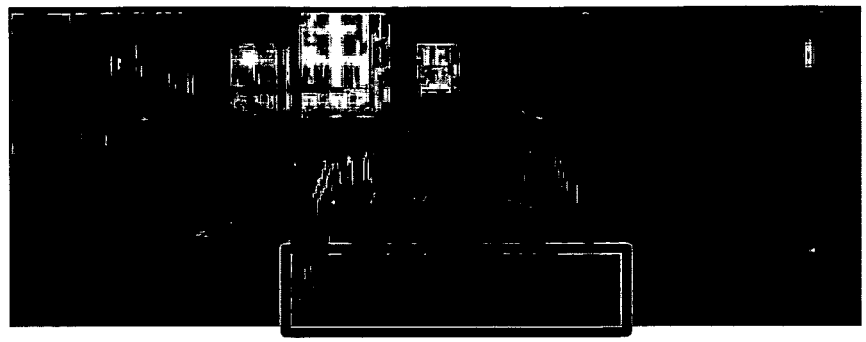
FIGS. 15A and 15B illustrate a comparison between straightforward mosaicing and an example video completion with motion inpainting, respectively, for a given image frame.
Figure 15A:
Figure 15B:
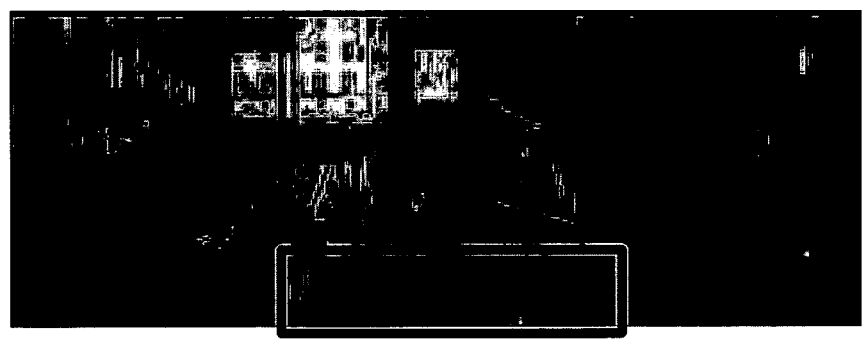
Figure 15B:

FIGS. 15A and 15B illustrate a comparison between straightforward mosaicing and an example video completion with motion inpainting, respectively, for a given image frame. FIG. 15A shows the result of direct or straightforward mosaicing. The straightforward mosaicing result looks unnaturally jaggy on the moving object, especially at the strap on the person's back, because multiple mosaics are used. FIG. 15B, on the other hand, shows the example result with video completion using motion inpainting as described herein. The result looks more natural and smooth.

Quantitative Visual Artifact Amelioration

In addition to further enhancing a stabilized video sequence, implementations of the video completion and deblurring algorithms described above can also be used in a range of other video enhancement applications. Two example applications are specifically described here: (i) sensor dust removal from a video sequence in which the visual artifact is caused by dirt spots on the video lens or a damaged CCD and (ii) overlaid text/logo removal. They can both be envisioned as a problem of filling up specific image areas that are indicated or marked as missing.

By way of example only, this can naturally be applied to the removal of a time-stamp from a video. In particular, when a stabilizing process is applied to a video that originally includes a time-stamp, it can become desirable to remove the time-stamp artifact from the stabilized video because the time-stamp becomes shaky in the final stabilized video.

In the examples described below with particular reference to FIGS. 16 and 17, the artifacts were manually marked as missing image areas. However, the artifacts can also be automatically ascertained by detecting any pixels at a static pixel location that remain visually constant throughout a video sequence while other pixels in the image frames change. The missing image areas are then filled up by an implementation of the described video completion technique.

Figure 16:
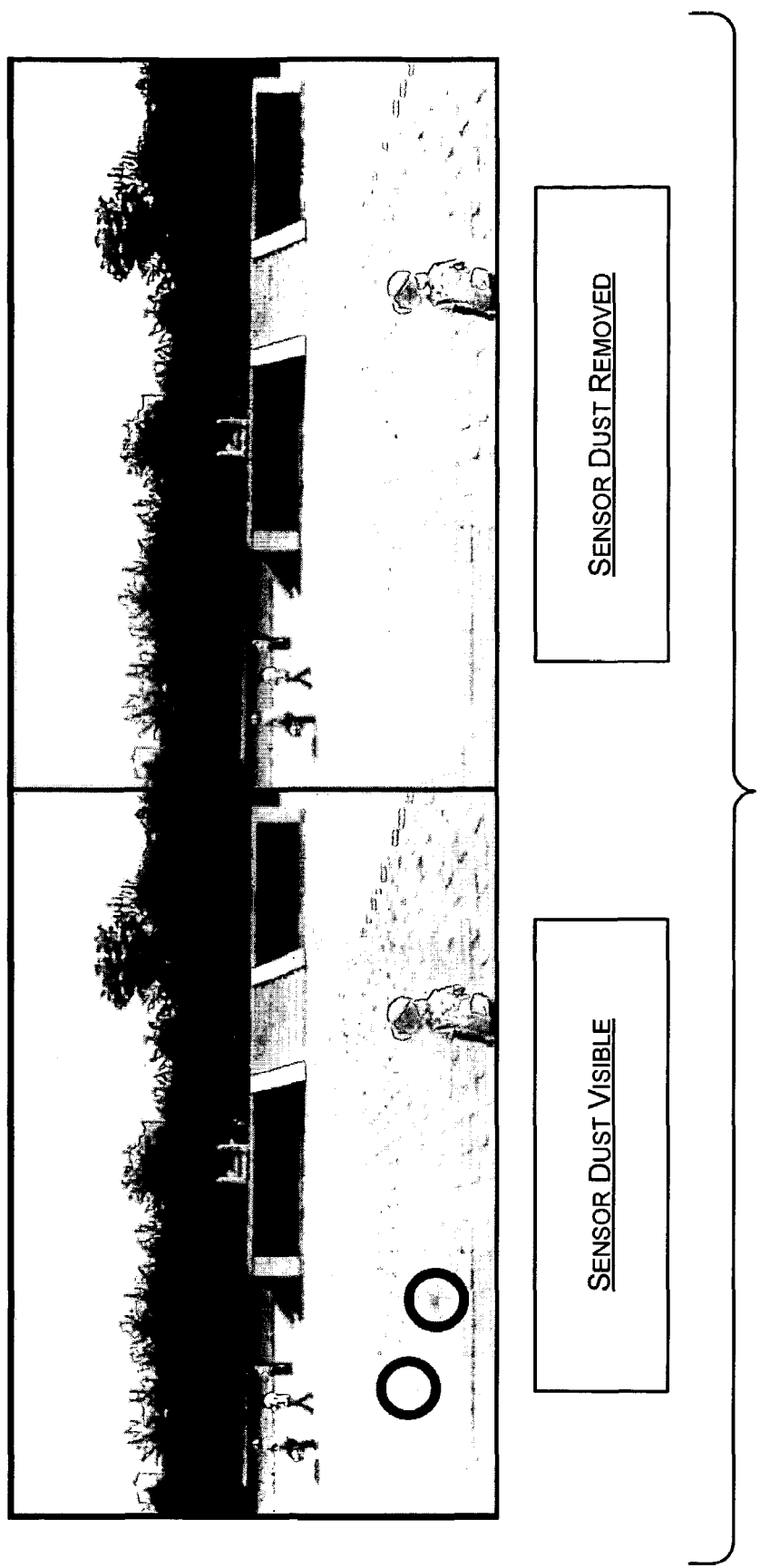
FIG. 16 is an image frame pair that illustrates an example of a visual artifact amelioration.

FIG. 16 is an image frame pair that illustrates an example of a visual artifact amelioration. Specifically, it shows the result of sensor dust removal. The left image is a frame from the original sequence; the two circles indicate where the spots on the lens result in visible markings. After artifact amelioration (e.g., correction), the resulting video image frames are free from these dirt spots as the pixel locations are filled up naturally as shown in the right image, which has the sensor dust removed.

Figure 17:
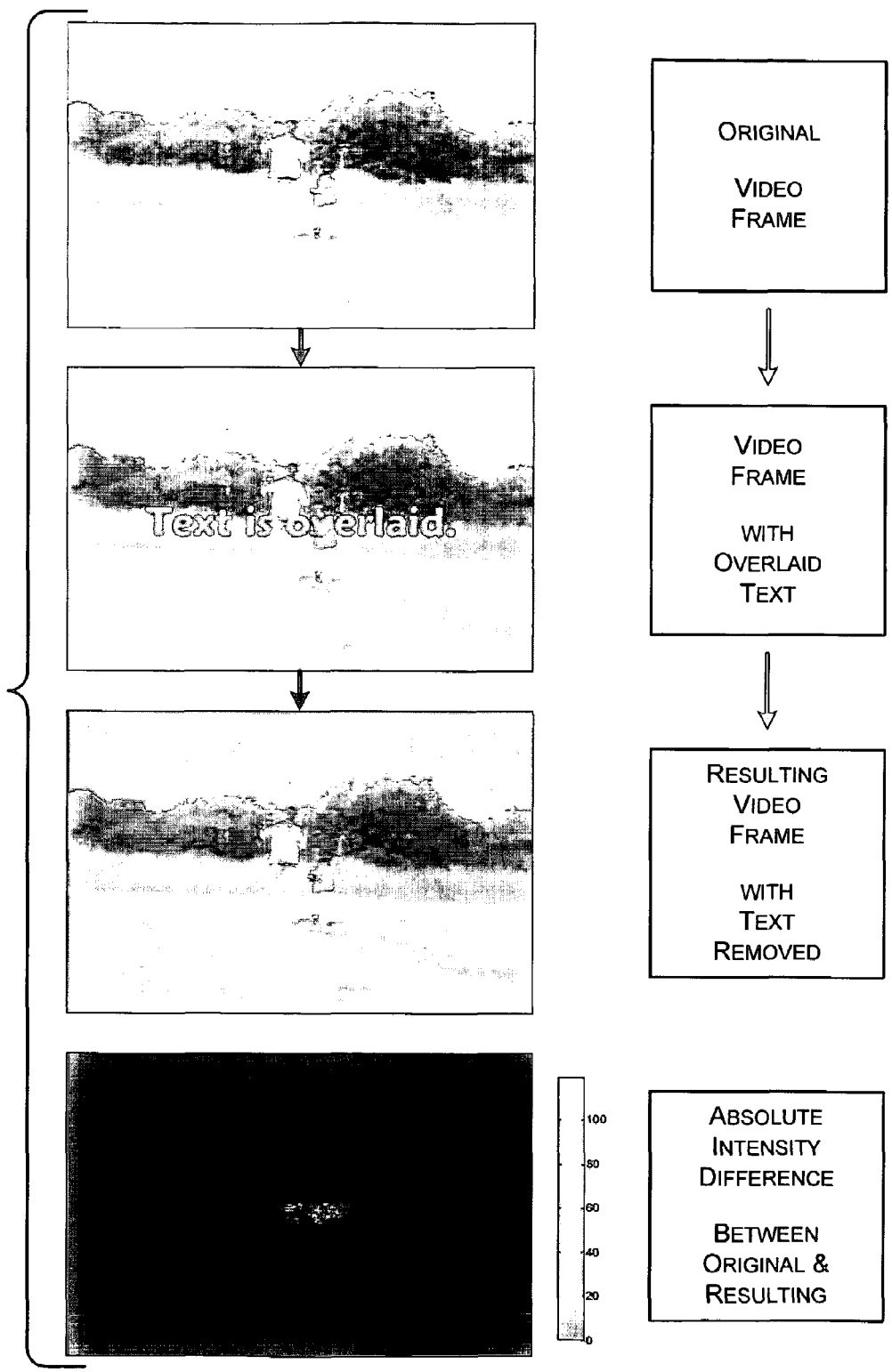
FIG. 17 is a series of image frames that illustrate an example result of adding and then removing a visual artifact.

FIG. 17 is a series of image frames that illustrate an example result of adding and then removing a visual artifact. Specifically, FIG. 17 shows the result of text removal from a video frame sequence. The first row shows an image frame from the original video sequence. The second row shows an image frame having text that is overlaid. After indicating or marking the text areas as missing image areas, an implementation of the described video completion technique is applied.

The third row of FIG. 17 shows the result of the video completion process. The resulting video image frame has the text removed. In fact, the example result looks almost identical to the original video frame image because the missing image areas are naturally filled up. The bottom row shows the absolute intensity difference between the original image frame and the resulting image frame. The resulting image frame sequence is not identical to the original image frame sequence as identifiable by the slight color differential in the area around the text overlay. However, the difference is small, and more importantly, visual appearance is well preserved.

Quantitative Conclusion

Described herein are example implementations of video completion and deblurring algorithms for generating full-frame stabilized videos. The video completion algorithm is based on motion inpainting. Motion inpainting propagates motion into missing image areas, and the propagated motion field is then used to relatively seamlessly stitch image mosaics. The described completion method implicitly enforces spatial and temporal consistency supported by motion inpainting. Spatial smoothness of the constructed mosaics is indirectly ensured by the smoothness of the extrapolated optical flow. Also, temporal consistency on both static and dynamic areas is given by optical flow from the neighboring frames. The described deblurring algorithm transfers and interpolates sharper pixels from neighboring frames. These enumerated properties and abilities make the resulting videos look natural and coherent. Additionally, the applicability of the described video completion algorithm to practical video enhancement has been evidenced by showing the results of both sensor dust removal and text removal.

The devices, actions, aspects, features, functions, procedures, modules, data structures, images, components, etc. of FIGS. 1-17 are illustrated in diagrams that are divided into multiple blocks. However, the order, interconnections, interrelationships, layout, etc. in which FIGS. 1-17 are described and/or shown are not intended to be construed as a limitations, and any number of the blocks can be modified, combined, rearranged, augmented, omitted, etc. in any manner to implement one or more systems, methods, devices, procedures, media, apparatuses, APIs, arrangements, etc. for video enhancement. Furthermore, although the description herein includes references to specific implementations (including a general device of FIG. 18), the illustrated and/or described implementations can be implemented in any suitable hardware, software, firmware, or combination thereof and using any suitable motion estimation algorithm(s), motion smoothing procedure(s), consistency constraint(s), relative blurriness measure(s), alignment error formulation(s), and/or weighting factor(s), and so forth.

EXAMPLE OPERATING ENVIRONMENT FOR COMPUTER OR OTHER DEVICE

Figure 18:
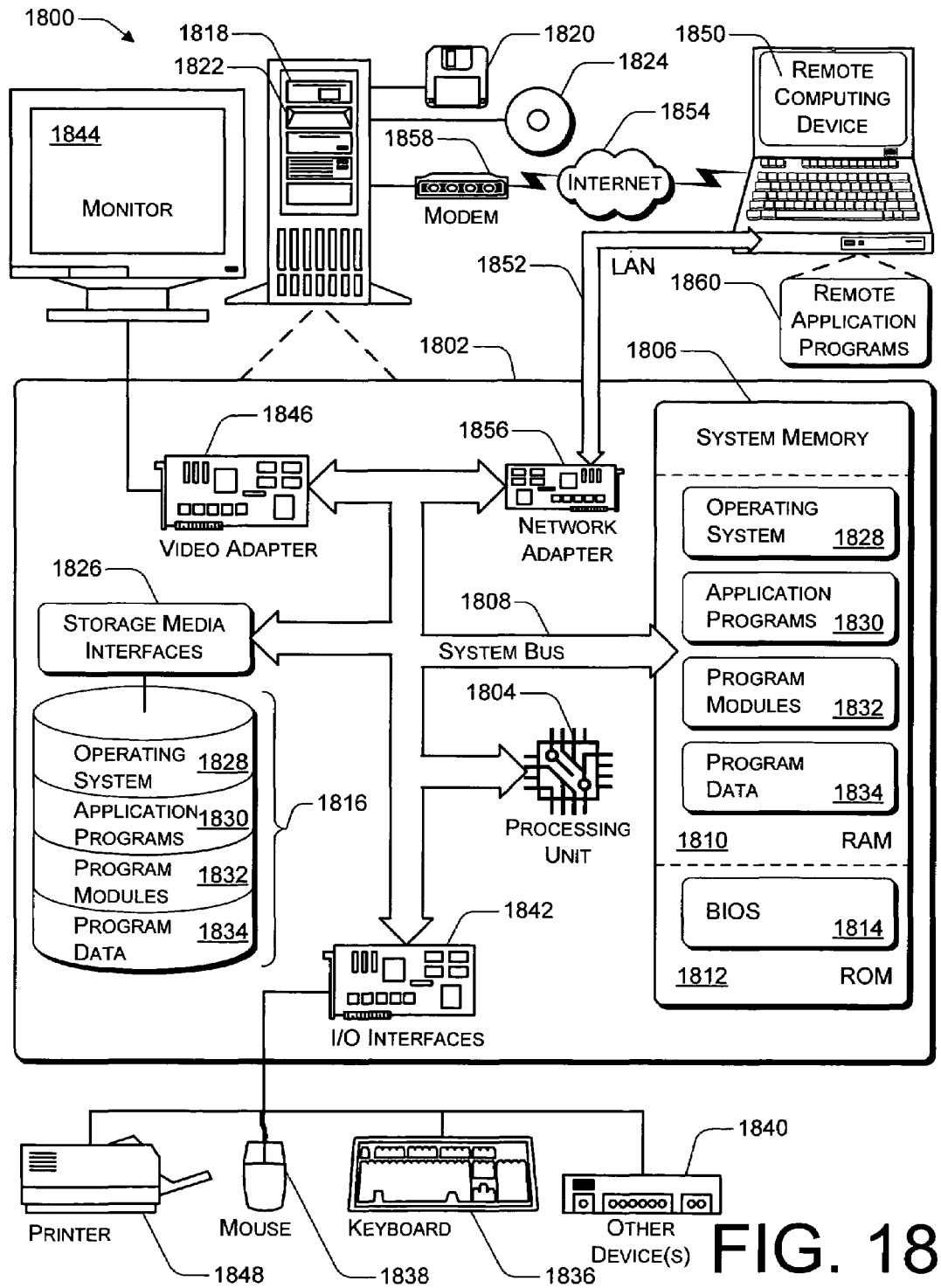
FIG. 18 illustrates an example of a computing (or general device) operating environment that is capable of (wholly or partially) implementing at least one aspect of video enhancement as described herein.

FIG. 18 illustrates an example computing (or general device) operating environment 1800 that is capable of (fully or partially) implementing at least one system, device, apparatus, component, arrangement, protocol, approach, method, procedure, media, application programming interface (API), some combination thereof, etc. for video enhancement as described herein. Operating environment 1800 may be utilized in the computer and network architectures described below.

Example operating environment 1800 is only one example of an environment and is not intended to suggest any limitation as to the scope of use or functionality of the applicable device (including computer, network node, entertainment device, mobile appliance, general electronic device, etc.) architectures. Neither should operating environment 1800 (or the devices thereof) be interpreted as having any dependency or requirement relating to any one or to any combination of components as illustrated in FIG. 18.

Additionally, implementations for video enhancement may be realized with numerous other general purpose or special purpose device (including computing system) environments or configurations. Examples of well-known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for video enhancement may be described in the general context of processor-executable instructions. Generally, processor-executable instructions include routines, programs, protocols, objects, functions, interfaces, components, data structures, etc. that perform and/or enable particular tasks and/or implement particular abstract data types. Realizations of video enhancement, as described in certain implementations herein, may also be practiced in distributed processing environments where tasks are performed by remotely-linked processing devices that are connected through a communications link and/or network. Especially, but not exclusively, in a distributed computing environment, processor-executable instructions may be located in separate storage media, executed by different processors, and/or propagated over transmission media.

Example operating environment 1800 includes a general-purpose computing device in the form of a computer 1802, which may comprise any (e.g., electronic) device with computing/processing capabilities. The components of computer 1802 may include, but are not limited to, one or more processors or processing units 1804, a system memory 1806, and a system bus 1808 that couples various system components including processor 1804 to system memory 1806.

Processors 1804 are not limited by the materials from which they are formed or the processing mechanisms employed therein. For example, processors 1804 may be comprised of semiconductor(s) and/or transistors (e.g., electronic integrated circuits (ICs)). In such a context, processor-executable instructions may be electronically-executable instructions. Alternatively, the mechanisms of or for processors 1804, and thus of or for computer 1802, may include, but are not limited to, quantum computing, optical computing, mechanical computing (e.g., using nanotechnology), and so forth.

System bus 1808 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1802 typically includes a variety of processor-accessible media. Such media may be any available media that is accessible by computer 1802 or another (e.g., electronic) device, and it includes both volatile and non-volatile media, removable and non-removable media, and storage and transmission media.

System memory 1806 includes processor-accessible storage media in the form of volatile memory, such as random access memory (RAM) 1810, and/or non-volatile memory, such as read only memory (ROM) 1812. A basic input/output system (BIOS) 1814, containing the basic routines that help to transfer information between elements within computer 1802, such as during start-up, is typically stored in ROM 1812. RAM 1810 typically contains data and/or program modules/instructions that are immediately accessible to and/or that are being presently operated on by processing unit 1804.

Computer 1802 may also include other removable/non-removable and/or volatile/non-volatile storage media. By way of example, FIG. 18 illustrates a hard disk drive or disk drive array 1816 for reading from and writing to a (typically) non-removable, non-volatile magnetic media (not separately shown); a magnetic disk drive 1818 for reading from and writing to a (typically) removable, non-volatile magnetic disk 1820 (e.g., a "floppy disk"); and an optical disk drive 1822 for reading from and/or writing to a (typically) removable, non-volatile optical disk 1824 such as a CD, DVD, or other optical media. Hard disk drive 1816, magnetic disk drive 1818, and optical disk drive 1822 are each connected to system bus 1808 by one or more storage media interfaces 1826. Alternatively, hard disk drive 1816, magnetic disk drive 1818, and optical disk drive 1822 may be connected to system bus 1808 by one or more other separate or combined interfaces (not shown).

The disk drives and their associated processor-accessible media provide non-volatile storage of processor-executable instructions, such as data structures, program modules, and other data for computer 1802. Although example computer 1802 illustrates a hard disk 1816, a removable magnetic disk 1820, and a removable optical disk 1824, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 1800.

Any number of program modules (or other units or sets of processor-executable instructions) may be stored on hard disk 1816, magnetic disk 1820, optical disk 1824, ROM 1812, and/or RAM 1810, including by way of general example, an operating system 1828, one or more application programs 1830, other program modules 1832, and program data 1834. These processor-executable instructions may include, for example, one or more of: a motion estimator 204, a motion smoother 206, a video image frame completer 208, a video image frame deblurrer 210, a visual artifact corrector 212, some combination thereof, and so forth.

A user may enter commands and/or information into computer 1802 via input devices such as a keyboard 1836 and a pointing device 1838 (e.g., a "mouse"). Other input devices 1840 (not shown specifically) may include a microphone, joystick, game pad, satellite dish, serial port, video camera, scanner, and/or the like. These and other input devices are connected to processing unit 1804 via input/output interfaces 1842 that are coupled to system bus 1808. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 1844 or other type of display device may also be connected to system bus 1808 via an interface, such as a video adapter 1846. Video adapter 1846 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 1844, other output peripheral devices may include components such as speakers (not shown) and a printer 1848, which may be connected to computer 1802 via input/output interfaces 1842.

Computer 1802 may operate in a networked environment using logical connections to one or more remote computers, such as a remote computing device 1850. By way of example, remote computing device 1850 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1850 is illustrated as a portable computer that may include many or all of the elements and features described herein with respect to computer 1802.

Logical connections between computer 1802 and remote computer 1850 are depicted as a local area network (LAN) 1852 and a general wide area network (WAN) 1854. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 1802 is usually connected to LAN 1852 via a network interface or adapter 1856. When implemented in a WAN networking environment, computer 1802 typically includes a modem 1858 or other component for establishing communications over WAN 1854. Modem 1858, which may be internal or external to computer 1802, may be connected to system bus 1808 via input/output interfaces 1842 or any other appropriate mechanism(s). It is to be appreciated that the illustrated network connections are examples and that other manners for establishing communication link(s) between computers 1802 and 1850 may be employed.

In a networked environment, such as that illustrated with operating environment 1800, program modules or other instructions that are depicted relative to computer 1802, or portions thereof, may be fully or partially stored in a remote media storage device. By way of example, remote application programs 1860 reside on a memory component of remote computer 1850 but may be usable or otherwise accessible via computer 1802. Also, for purposes of illustration, application programs 1830 and other processor-executable instructions such as operating system 1828 are illustrated herein as discrete blocks, but it is recognized that such programs, components, and other instructions reside at various times in different storage components of computing device 1802 (and/or remote computing device 1850) and are executed by processor(s) 1804 of computer 1802 (and/or those of remote computing device 1850).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. A method implemented by a computing device comprising at least one processor and memory, the method comprising:

propagating, by the computing device, motion data of a motion map from a known image area of a current image frame to one or more missing image areas of the current image frame to produce an extended motion map corresponding to the known image area and the one or more missing image areas of the current image frame; and warping, by the computing device, pixels from at least one neighboring image frame to the one or more missing image areas of the current image frame responsive to the extended motion map;

wherein the propagating comprises producing the extended motion map using, for each individual pixel of the one or more missing image areas, a weighted average of a set of motion vectors of a set of pixels of the known image area that comprise neighboring pixels for each individual pixel of the one or more missing image areas.

2. The method as recited in claim 1, further comprising:
determining multiple respective alignment errors between the current image frame and respective ones of multiple neighboring image frames;
selecting a particular respective neighboring image frame having a lowest respective alignment error to be the at least one neighboring image frame used in the warping; and
computing local motion with respect to the at least one neighboring image frame using common coverage areas between the current image frame and the at least one neighboring image frame;
wherein the computed local motion comprises the motion data that is propagated in the propagating.

3. The method as recited in claim 1, further comprising:
warping multiple pixels from multiple neighboring image frames to a corresponding pixel of the one or more missing image areas of the current image frame;
determining if the warped multiple pixels meet a consistency constraint;
if the warped multiple pixels are determined to meet a consistency constraint, accepting a value of the warped multiple pixels from a compatible frame as a value for the corresponding pixel; and
if the warped multiple pixels are not determined to meet a consistency constraint, performing the propagating motion data and the warping pixels for the corresponding pixel.

4. The method as recited in claim 1, further comprising:
estimating global motion for multiple image frames of a video sequence, the video sequence including the current image frame and the at least one neighboring image frame; and
smoothing the global motion of the multiple image frames by smoothing respective individual local displacements of respective individual ones of the multiple image frames.

5. The method as recited in claim 4, wherein the smoothing comprises:
computing a smoothing transformation for a given image frame to a motion-compensated image frame using transformation matrices of image frames that are neighbors of the given image frame while excluding transformation matrices of non-neighboring image frames.

6. The method as recited in claim 1, wherein the propagating comprises:
extrapolating the motion data by processing pixels of the one or more missing image areas in an ascending distance order away from an initial boundary between the known image area and the one or more missing image areas such that pixels relatively closer to the known image area are processed before pixels relatively further from the known image area.

7. The method as recited in claim 1, wherein the weighted average reflects motion similarity by being based on respective similarities of color or intensity between each individual pixel and respective pixels of the set of pixels.

8. One or more processor-accessible media including processor-executable instructions comprising a video enhancement module that is capable of ameliorating visual artifacts from a video sequence; the video enhancement module adapted to remove a visual artifact from an image frame to thereby create a missing image area; the video enhancement module further adapted to fill in pixels of the missing image area by performing a video completion process that includes motion inpainting;
wherein the motion inpainting involves extrapolation of motion data to the pixels of the missing image area from pixels located in another known area of the image frame, the extrapolation comprising, for each individual pixel of the missing image area, calculating a weighted average of a set of motion vectors of a set of pixels of the another known image area that comprise neighboring pixels for each individual pixel of the missing image area; and
wherein the video completion process further includes pixel warping from at least one other image frame of the video sequence responsive to the extrapolated motion data.

9. The one or more processor-accessible media as recited in claim 8, wherein the video enhancement module is further capable of deblurring the video sequence by replacing relatively less sharp pixels of the image frame with relatively more sharp pixels of one or more other image frames of the video sequence.

10. The one or more processor-accessible media as recited in claim 8, wherein the visual artifact comprises at least one of: (i) a mark resulting from an object on a lens of a video camera, (ii) a mark resulting from a defect of a charge coupled device (CCD) of a video camera, or (iii) alphanumeric characters and/or a logo that overlays a portion of the image frame.

11. The one or more processor-accessible media as recited in claim 8, wherein the video enhancement module is further adapted (i) to identify the visual artifact automatically based on one or more characteristics of pixels that form the visual artifact and/or (ii) to identify the visual artifact responsive to manual input indicating a pixel area of the visual artifact.

12. One or more computer-readable media storing computer-executable instructions that, when executed on one or more processors, perform acts comprising:
propagating motion data of a motion map from a known image area of a current image frame to one or more missing image areas of the current image frame to produce an extended motion map corresponding to the known image area and the one or more missing image areas of the current image frame; and
warping pixels from at least one neighboring image frame to the one or more missing image areas of the current image frame responsive to the extended motion map;
wherein the propagating comprises producing the extended motion map using, for each individual pixel of the one or more missing image areas, a weighted average of a set of motion vectors of a set of pixels of the known image area that comprise neighboring pixels for each individual pixel of the one or more missing image areas, and wherein the weighted average reflects motion similarity by being based on respective similarities of color or intensity between each individual pixel and respective pixels of the set of pixels.

13. The one or more computer-readable media as recited in claim 12, further comprising:
determining multiple respective alignment errors between the current image frame and respective ones of multiple neighboring image frames;
selecting a particular respective neighboring image frame having a lowest respective alignment error to be the at least one neighboring image frame used in the warping; and computing local motion with respect to the at least one neighboring image frame using common coverage areas between the current image frame and the at least one neighboring image frame;

wherein the computed local motion comprises the motion data that is propagated in the propagating.

14. The one or more computer-readable media as recited in claim 12, further comprising:

warping multiple pixels from multiple neighboring image frames to a corresponding pixel of the one or more missing image areas of the current image frame;

determining if the warped multiple pixels meet a consistency constraint;

if the warped multiple pixels are determined to meet a consistency constraint, accepting a value of the warped multiple pixels from a compatible frame as a value for the corresponding pixel; and if the warped multiple pixels are not determined to meet a consistency constraint, performing the propagating motion data and the warping pixels for the corresponding pixel.

15. The one or more computer-readable media as recited in claim 12, further comprising:

estimating global motion for multiple image frames of a video sequence, the video sequence including the current image frame and the at least one neighboring image frame; and smoothing the global motion of the multiple image frames by smoothing respective individual local displacements of respective individual ones of the multiple image frames.

16. The one or more computer-readable media as recited in claim 15, wherein the smoothing comprises:

computing a smoothing transformation for a given image frame to a motion-compensated image frame using transformation matrices of image frames that are neighbors of the given image frame while excluding transformation matrices of non-neighboring image frames.

17. The one or more computer-readable media as recited in claim 12, wherein the propagating comprises:

extrapolating the motion data by processing pixels of the one or more missing image areas in an ascending distance order away from an initial boundary between the known image area and the one or more missing image areas such that pixels relatively closer to the known image area are processed before pixels relatively further from the known image area.

* * * * *